(12) United States Patent
Cooper et al.

(10) Patent No.: US 10,995,836 B2
(45) Date of Patent: May 4, 2021

(54) DRIVE UNIT ASSEMBLY

(71) Applicant: DANA AUTOMOTIVE SYSTEMS GROUP, LLC, Maumee, OH (US)

(72) Inventors: Ken E. Cooper, Las Vegas, NV (US); Thomas L. Nahrwold, Napoleon, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 16/464,955

(22) PCT Filed: Nov. 30, 2017

(86) PCT No.: PCT/US2017/063952
§ 371 (c)(1),
(2) Date: May 29, 2019

(87) PCT Pub. No.: WO2018/102549
PCT Pub. Date: Jun. 7, 2018

(65) Prior Publication Data
US 2019/0309838 A1 Oct. 10, 2019

Related U.S. Application Data

(60) Provisional application No. 62/428,064, filed on Nov. 30, 2016.

(51) Int. Cl.
*F16H 1/28* (2006.01)
*F16H 37/08* (2006.01)
(Continued)

(52) U.S. Cl.
CPC ............. *F16H 37/082* (2013.01); *B60K 1/00* (2013.01); *B60K 6/48* (2013.01); *B60K 17/02* (2013.01);
(Continued)

(58) Field of Classification Search
CPC .......... F16H 37/08; F16H 48/24; F16H 48/08; F16H 48/36; B60K 17/348;
(Continued)

(56) References Cited

U.S. PATENT DOCUMENTS 9,156,348 B1\* 10/2015 Swales ................... B60T 1/062
2007/0123383 A1\* 5/2007 Yokoyama ......... B60K 23/0808
475/5
(Continued)

*Primary Examiner* — Roger L Pang
(74) *Attorney, Agent, or Firm* — McCoy Russell LLP

(57) ABSTRACT

A drive unit assembly. The drive unit includes a motor drivingly connected to a motor output shaft which in turn is drivingly connected to a sun gear of a gear assembly. The gear assembly further includes a gear assembly housing, one or more planetary gears and a pinion gear. At least a portion of the one or more planetary gears are drivingly connected to the sun gear, the gear assembly housing and a plurality of gear teeth circumferentially extending from an inner surface of a drive unit housing. The pinion gear has a first side and a second side, where the second side of the pinion gear is integrally connected to a first end portion of the gear assembly housing. Drivingly connected to the pinion gear is a differential ring gear of a differential assembly having a first side gear, a second side gear and one or more bevel gears.

18 Claims, 8 Drawing Sheets

(51) Int. Cl.
  *B60K 1/00* (2006.01)
  *B60K 17/16* (2006.01)
  *B60K 23/04* (2006.01)
  *B60L 15/20* (2006.01)
  *F16D 11/14* (2006.01)
  *F16H 48/08* (2006.01)
  *F16H 48/24* (2006.01)
  *B60K 6/48* (2007.10)
  *B60K 17/08* (2006.01)
  *B60K 17/02* (2006.01)
  *B60K 6/52* (2007.10)
  *B60K 17/354* (2006.01)
  *B60K 23/08* (2006.01)
  *F16D 11/00* (2006.01)
  *F16H 48/36* (2012.01)

(52) U.S. Cl.
  CPC .............. *B60K 17/08* (2013.01); *B60K 17/16* (2013.01); *B60K 17/165* (2013.01); *B60K 23/04* (2013.01); *B60L 15/20* (2013.01); *F16D 11/14* (2013.01); *F16H 1/28* (2013.01); *F16H 48/08* (2013.01); *F16H 48/24* (2013.01); *B60K 6/52* (2013.01); *B60K 17/354* (2013.01); *B60K 23/0808* (2013.01); *B60K 2001/001* (2013.01); *B60L 2240/421* (2013.01); *B60L 2240/461* (2013.01); *B60Y 2200/91* (2013.01); *B60Y 2200/92* (2013.01); *B60Y 2300/80* (2013.01); *F16D 2011/002* (2013.01); *F16H 48/36* (2013.01)

(58) Field of Classification Search
  CPC ...... B60K 23/0808; B60K 6/48; B60K 17/16; B60K 23/04; B60K 17/165; B60Y 2200/92; B60Y 2200/91
  USPC ........................................ 475/149, 204, 223
  See application file for complete search history.

(56) References Cited

U.S. PATENT DOCUMENTS

| | | | |
|---|---|---|---|
| 2015/0019094 A1* | 1/2015 | Larkin | B60K 23/0808 701/65 |
| 2015/0152947 A1* | 6/2015 | Smetana | B60K 1/00 475/5 |
| 2017/0136867 A1* | 5/2017 | Holmes | F16H 3/725 |

* cited by examiner

DRIVE UNIT ASSEMBLY

CROSS-REFERENCE TO RELATED APPLICATIONS

The present application claims the benefit to U.S. Provisional Patent Application No. 62/428,064 filed on Nov. 30, 2016, which is incorporated herein by reference in its entirety.

FIELD OF THE DISCLOSURE

The present disclosure relates to drive unit assembly for use in a motor vehicle.

BACKGROUND OF THE DISCLOSURE

In recent years' considerable attention has been given to producing vehicles with increased fuel efficiency to reduce the overall fuel consumption of motorized vehicles all over the world. Additionally, in light of increasingly stringent emission controls considerable attention has been given to producing vehicles that produce fewer emissions. As a result, considerable attention is being given to producing hybrid vehicles and all electric vehicles that have a reduced fuel consumption and produce fewer emissions. Hybrid vehicles typically use two or more distinct power sources to provide the power necessary to drive the vehicle.

Many conventional hybrid vehicles incorporate the use of an internal combustion engine and an electric motor to provide the rotational power necessary to drive the vehicle. The electric motor of the hybrid vehicle alone or in combination with the internal combustion engine provides the rotational power necessary to drive the forward axle system of the vehicle. Additionally, the internal combustion engine of some conventional all-wheel drive (AWD) hybrid vehicles is used to provide the rotational power necessary to drive the forward axle system and the rear axle system of the vehicle. In order for the internal combustion engine to provide the rear axle system with the rotational power necessary to drive the vehicle, a secondary drive-line system is used. The secondary drive-line system extends from the internal combustion engine of the vehicle to the rear axle system. The secondary drive-line adds additional weight to the vehicle and takes up space under the vehicle. It would therefore be advantageous to develop a drive unit that would avoid the use of a secondary drive-line to drive the rear axle system of the vehicle.

SUMMARY OF THE DISCLOSURE

A drive unit assembly for use in a motor vehicle. The drive unit assembly includes a motor that is drivingly connected to a motor output shaft. At least a portion of a first end portion of the motor output shaft is drivingly connected to at least a portion of the motor and at least a portion of the second end portion of the motor output shaft is drivingly connected to at least a portion of a sun gear of a gear assembly. The gear assembly further includes a gear assembly housing, a pinion gear and one or more planetary gears. The gear assembly housing has a first end portion, a second end portion, an inner surface and an outer surface defining a hollow portion therein. At least a portion of the sun gear and at least a portion of the one or more planetary gears are disposed within the hollow portion of the gear assembly housing of the gear assembly. Additionally, at least a portion of the one or more planetary gears of the gear assembly are drivingly connected to at least a portion of the sun gear, the gear assembly housing and a plurality of gear teeth circumferentially extending from at least a portion of an inner surface of a drive unit housing.

The pinion gear of the gear assembly has a first side, a second side, an inner surface and an outer surface defining a hollow portion therein. Integrally connected to at least a portion of the second side of the pinion gear is at least a portion of the first end portion of the gear assembly housing. Drivingly connected to at least a portion of the pinion gear of the gear assembly is a differential ring gear of a differential assembly. The differential assembly further includes a differential case, a differential ring gear, a first side gear, a second side gear and one or more bevel gears.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

The present disclosure relates to a drive unit for a motor vehicle. As a non-limiting example, the drive units disclosed herein may be used as a rear axle drive unit, a forward axle drive unit, a primary drive unit a secondary drive unit, a rear drive unit to drive and/or a drive unit to drive one or more of the wheels of the vehicle independently.

It is within the scope of this disclosure, and as a non-limiting example, that the drive units disclosed herein may be used in automotive, off-road vehicle, all-terrain vehicle, construction, structural, marine, aerospace, locomotive, military, machinery, robotic and/or consumer product applications. Additionally, as a non-limiting example, the drive units disclosed herein may also be used in passenger vehicle, electric vehicle, hybrid vehicle, commercial vehicle and/or heavy vehicle applications.

Figure 1:
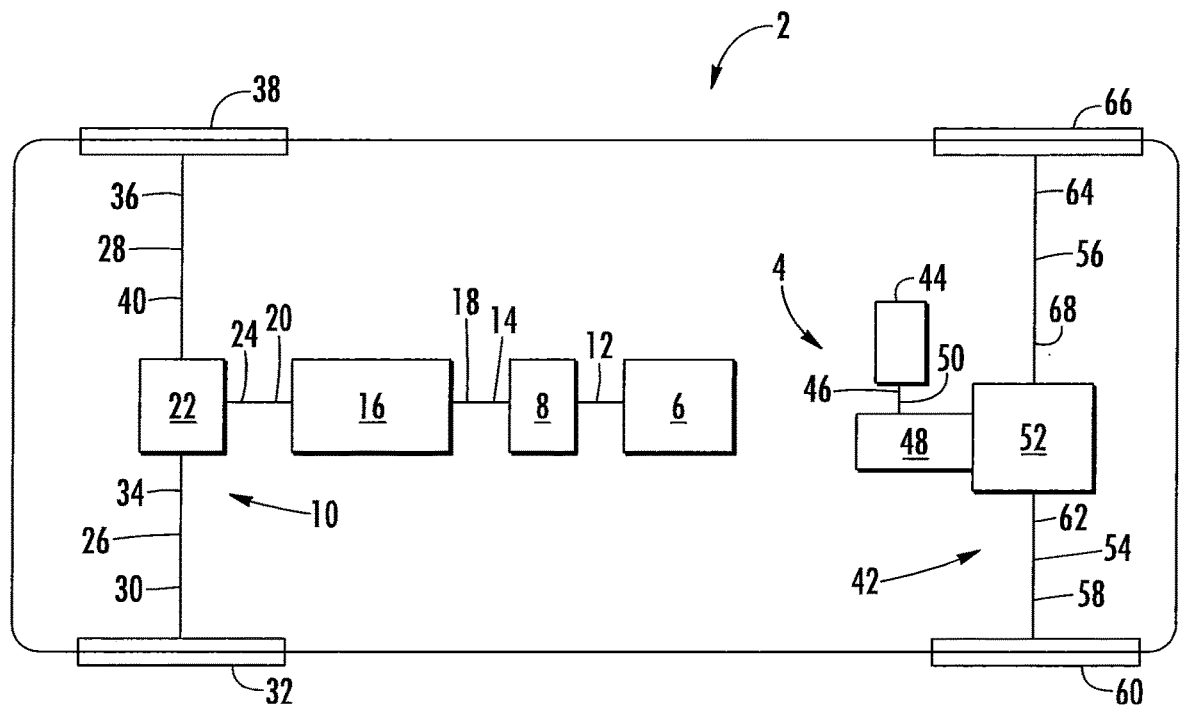
FIG. 1 is a schematic top-plan view of a vehicle having a drive unit assembly according to an embodiment of the disclosure.

FIG. 1 is a schematic top-plan view of a vehicle 2 having a drive unit assembly 4 according to an embodiment of the disclosure. It is within the scope of this disclosure that the vehicle 2 may be a hybrid vehicle having any type of drive-train configuration such as but not limited to a series hybrid drive-train configuration or a parallel hybrid drive-train configuration. As illustrated in FIG. 1 of the disclosure and as a non-limiting example, the vehicle 2 is a hybrid vehicle with a parallel hybrid drive-train configuration.

An engine 6 and a motor 8 are used to provide the rotational power necessary to drive a forward axle system 10 of the vehicle 2. As non-limiting example, the engine 6 of the vehicle 2 may be an internal combustion engine, a gas turbine and/or a steam turbine. Additionally, as a non-limiting example, the motor 8 of the vehicle 2 may be an electric motor and/or any other type of motor that is able to convert an amount of electrical energy into an amount of mechanical energy. The engine 6 of the vehicle 2 is drivingly connected to an end of an engine output shaft 12. Drivingly connected to an end of the engine output shaft 12, opposite the engine 6, is the motor 8 of the vehicle 2. A motor output shaft 14 is then drivingly connected to an end of the motor 8 opposite the engine output shaft 12.

Drivingly connected to an end of the motor output shaft 14, opposite the motor 8, is a transmission input shaft 18. The transmission input shaft drivingly connects the engine 6 and the motor 8 to a transmission 16 of the vehicle 2. As a result, an end of the transmission input shaft 18, opposite the motor output shaft 14, is drivingly connected to an end of the transmission 16. The transmission 16 is a power management system which provides controlled application of the rotational power generated by the engine 6 and/or the motor 8 by means of a gear box.

A transmission output shaft 20 is drivingly connected to an end of the transmission 16 opposite the transmission input shaft 18. The transmission output shaft 20 extends from the end of the transmission 16, opposite the transmission input shaft 18, toward a differential 22 of the forward axle system 10. As illustrated in FIG. 1 of the disclosure and as a non-limiting example, an end of the transmission output shaft 20, opposite the transmission 16, is drivingly connected to a forward axle system input shaft 24. The forward axle system input shaft 24 of the vehicle 2 drivingly connects the transmission 16 to the front axle system 10 of the vehicle 2. The forward axle differential 22 is a set of gears that allows the outer drive wheel(s) of the vehicle 2 to rotate at a faster rate than the inner drive wheel(s). The rotational power is transmitted through the forward axle system 10 as described in more detail below.

The forward axle system 10 further includes a first forward axle half shaft 26 and a second forward axle half shaft 28. The first forward axle half shaft 26 extends substantially perpendicular to the forward axle system input shaft 24. At least a portion of a first end portion 30 of the first forward axle half shaft 26 is drivingly connected to at least a portion of a first forward axle wheel assembly 32 and at least a portion of a second end portion 34 of the first forward axle half shaft 26 is drivingly connected to an end of the forward axle differential 22. As a non-limiting example, the second end portion 34 of the first forward axle half shaft 26 may be drivingly connected to a differential side gear, a separate stub shaft, a separate coupling shaft, a first forward axle differential output shaft, a first forward axle disconnect assembly and/or a shaft that is formed as part of a differential side gear.

Extending substantially perpendicular to the forward axle system input shaft 24 is the second forward axle half shaft 28 of the forward axle system 10. At least a portion of a first end portion 36 of the second forward axle half shaft 28 is drivingly connected to at least a portion of a second forward axle wheel assembly 38. At least a portion of a second end portion 40 of the second forward axle half shaft is drivingly connected to an end of the forward axle differential 22 opposite the first forward axle half shaft 26. As a non-limiting example, the second end portion 40 of the second forward axle half shaft 28 may be drivingly connected to a differential side gear, a separate stub shaft, a separate coupling shaft, a second forward axle differential output shaft, a second forward axle disconnect assembly and/or a shaft that is formed as part of a differential side gear.

In accordance with the disclosure illustrated in FIG. 1 and as a non-limiting example, the drive unit assembly 4 of the vehicle 2 provides the rotational power necessary to drive a rear axle system 42. The drive unit assembly 4 eliminates the need for a secondary drive-line (not shown) and/or a transfer case (not shown) to provide an all-wheel drive (AWD) hybrid vehicle. As a result, the drive unit assembly 4 reduces the overall weight, cost and complexity of the drive-train of the vehicle 2. Additionally, by removing the secondary drive-line (not shown) and/or the transfer case (not shown) from the vehicle 2, it provides the vehicle 2 with the additional space needed under the vehicle 2 for battery storage.

As illustrated in FIG. 1 of the disclosure and as a non-limiting example, the drive unit assembly 4 includes a motor 44 that is drivingly connected to a motor output shaft 46. The motor output shaft 46 of the vehicle 2 then extends from the motor 44 toward a gear assembly 48. In accordance with the embodiment of the disclosure illustrated in FIG. 1 and as a non-limiting example, the motor 44 of the drive unit assembly 4 provides the rotational power needed to drive the rear axle system 42 of the vehicle 2. It is within the scope of this disclosure and as a non-limiting example that the motor 44 of the vehicle 2 may be an electric motor and/or any other type of motor that is able to convert an amount of electrical energy into an amount of mechanical energy.

Drivingly connected to an end of the motor output shaft 46, opposite the motor 44, is the gear assembly 48 of the drive unit assembly 4. The gear assembly 48 of the drive unit assembly 4 of the vehicle 2 is a set of gears that selectively reduces the overall amount of rotational speed generated by the motor 44 while increasing the overall amount of torque generated by the motor 44. It is within the scope of this disclosure and as a non-limiting example, that the gear assembly 48 may be a planetary gear assembly according to an embodiment of the disclosure.

In accordance with an embodiment of the disclosure and as a non-limiting example, at least a portion of an end of the motor output shaft 46, opposite the motor 44, may be drivingly connected to the gear assembly 48 of the drive unit assembly 4 by using a gear assembly input shaft 50. As illustrated in FIG. 1 of the disclosure and as a non-limiting example, the end of the gear assembly input shaft 50, opposite the motor output shaft 46, is drivingly connected to at least a portion of the gear assembly 48 of the drive unit assembly 4 of the vehicle 2. According to an alternative embodiment of the disclosure (not shown) and as a non-limiting example, at least a portion of an end of the motor output shaft 46, opposite the motor 44, may be directly drivingly connected to at least a portion of the gear assembly 48 of the drive unit assembly 4.

Drivingly connected to at least a portion of the gear assembly 48 of the drive unit assembly 4 is a rear axle differential assembly 52 of the rear axle system 42 of the vehicle 2. The rear axle differential assembly 52 of the vehicle 2 is a set of gears that allows the outer drive wheel(s) of the vehicle 2 to rotate at a faster rate that the inner drive wheel(s). The rotational power is transmitted through the rear axle system 42 as described in more detail below.

As illustrated in FIG. 1 of the disclosure and as a non-limiting example, the rear axle system 42 further includes a first rear axle half shaft 54 and a second rear axle half shaft 56. At least a portion of a first end portion 58 of the first rear axle half shaft 54 is drivingly connected to at least a portion of a first rear axle wheel assembly 60 and at least a portion of a second end 62 of the first rear axle half shaft 54 is drivingly connected to an end of the rear axle differential assembly 52. As a non-limiting example, the second end portion 62 of the first rear axle half shaft 54 is drivingly connected to a rear axle differential side gear, a separate stub shaft, a separate coupling shaft, a first rear axle differential output shaft, a first rear axle half shaft disconnect assembly and/or a shaft that is formed as part of a rear axle differential side gear.

At least a portion of a first end portion 64 of the second rear axle half shaft 56 is drivingly connected to at least a portion of a second rear axle wheel assembly 66. As illustrated in FIG. 1 of the disclosure and as a non-limiting example, at least a portion of a second end portion 68 of the second rear axle half shaft 56 is drivingly connected to an end of the rear axle differential assembly 52 opposite the first rear axle half shaft 54. It is within the scope of this disclosure and as a non-limiting example that the second end 68 of the second rear axle half shaft 56 may be drivingly connected to a rear axle differential side gear, a separate stub shaft, a separate coupling shaft, a second rear axle differential output shaft, a second rear axle disconnect assembly and/or a shaft that is formed as part of a rear axle differential side gear.

Figure 2:
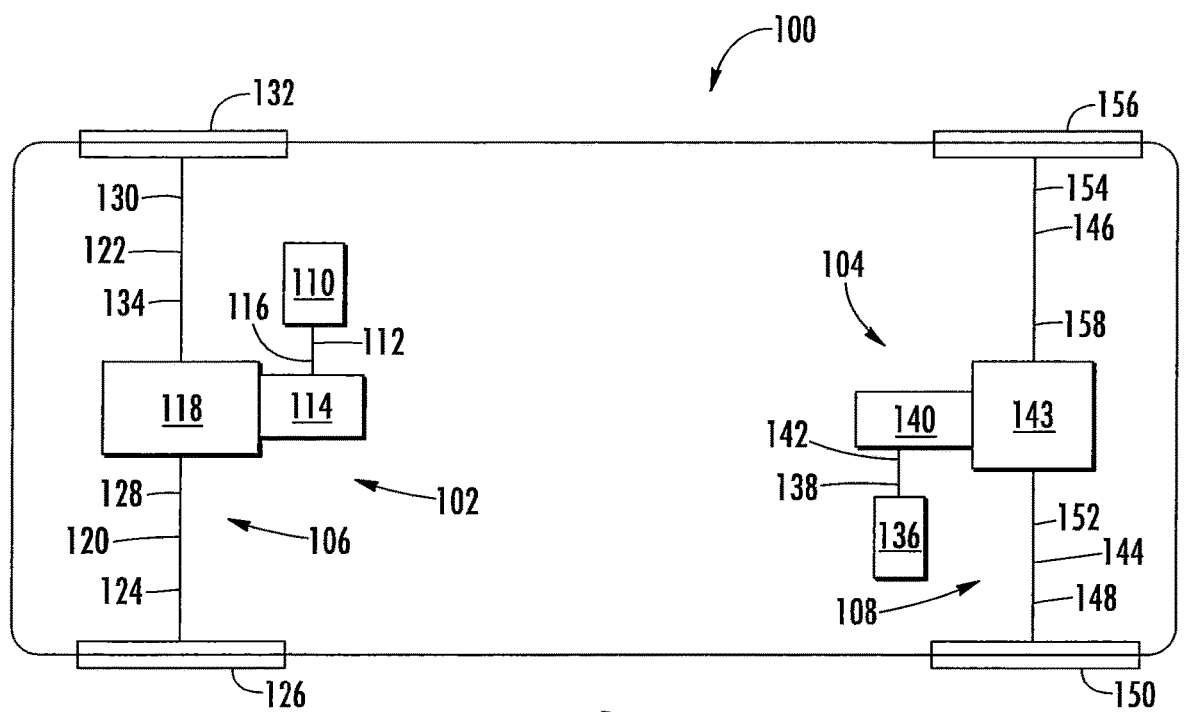
FIG. 2 is a schematic top-plan view of another vehicle having one or more drive unit assemblies according to an embodiment of the disclosure.

FIG. 2 is a schematic top-plan view of a vehicle 100 having one or more drive unit assemblies according to an embodiment of the disclosure. It is within the scope of this disclosure that the vehicle 100 may an electric drive vehicle. In accordance with the embodiment of the disclosure illustrated in FIG. 2 and as a non-limiting example, a forward drive unit assembly 102 of the vehicle 2 provides the rotational power necessary to drive a forward axle system 106 and a rear drive unit assembly 104 provides the rotational power necessary to drive a rear axle system 108 of the vehicle 2.

As illustrated in FIG. 2 of the disclosure and as a non-limiting example, the forward drive unit assembly 102 of the vehicle 100 includes a forward drive unit motor 110 that is drivingly connected to a forward drive unit motor output shaft 112. The forward drive unit motor output shaft 112 of the vehicle 100 extends from the forward drive unit motor 110 toward a forward dive unit gear assembly 114 of the forward drive unit assembly 102. In accordance with the embodiment of the disclosure illustrated in FIG. 2 and as a non-limiting example, the forward drive unit motor 110 of the forward drive unit assembly 102 provides the rotational power needed to drive the forward axle system 106 of the vehicle 100. It is within the scope of this disclosure and as a non-limiting example that the forward drive unit motor 110 of the vehicle 100 may be an electric motor and/or any other type of motor that is able to convert an amount of electrical energy into an amount of mechanical energy.

Drivingly connected to an end of the forward drive unit motor output shaft 112, opposite the forward drive unit motor 110, is the forward dive unit gear assembly 114 of the forward drive unit assembly 102. The forward dive unit gear assembly 114 of the forward drive unit assembly 102 of the vehicle 100 is a set of gears that selectively reduces the overall amount of rotational speed generated by the forward drive unit motor 110 while increasing the overall amount of torque generated by the forward drive unit motor 110. It is within the scope of this disclosure and as a non-limiting example, that the forward dive unit gear assembly 114 may be a planetary gear assembly according to an embodiment of the disclosure.

In accordance with an embodiment of the disclosure and as a non-limiting example, at least a portion of an end of the forward drive unit motor output shaft 112, opposite the forward drive unit motor 110, may be drivingly connected to the forward dive unit gear assembly 114 of the forward drive unit assembly 102 by using a gear assembly input shaft 116. As illustrated in FIG. 2 of the disclosure and as a non-limiting example, the end of the gear assembly input shaft 116, opposite the forward drive unit motor output shaft 112, is drivingly connected to at least a portion of the forward dive unit gear assembly 114 of the forward drive unit assembly 102 of the vehicle 100. According to an alternative embodiment of the disclosure (not shown) and as a non-limiting example, at least a portion of an end of the forward drive unit motor output shaft 112, opposite the forward drive unit motor 110, may be directly drivingly connected to at least a portion of the forward dive unit gear assembly 114 of the forward drive unit assembly 102.

Drivingly connected to at least a portion of the forward dive unit gear assembly 114 of the forward drive unit assembly 102 is a forward axle differential assembly 118 of the forward axle system 106 of the vehicle 100. The forward axle differential assembly 118 is a set of gears that allows the outer drive wheel(s) of the vehicle 100 to rotate at a faster rate that the inner drive wheel(s). The rotational power is transmitted through the forward axle system 106 as described in more detail below.

As illustrated in FIG. 2 of the disclosure and as a non-limiting example, the forward axle system 106 further includes a first forward axle half shaft 120 and a second forward axle half shaft 122. At least a portion of a first end portion 124 of the first forward axle half shaft 120 is drivingly connected to at least a portion of a first forward axle wheel assembly 126 and at least a portion of a second end portion 128 of the first forward axle half shaft 120 is drivingly connected to an end of the forward axle differential assembly 118. As a non-limiting example, the second end portion 128 of the first forward axle half shaft 120 may be drivingly connected to a forward axle differential side gear, a separate stub shaft, a separate coupling shaft, a first forward axle differential output shaft, a first forward axle disconnect assembly and/or a shaft that is formed as part of a forward axle differential side gear.

At least a portion of a first end portion 130 of the second forward axle half shaft 122 is drivingly connected to at least a portion of a second forward axle wheel assembly 132 of the vehicle 100. As illustrated in FIG. 2 of the disclosure and as a non-limiting example, at least a portion of a second end portion 134 of the second forward axle half shaft 122 is drivingly connected to an end of the forward axle differential assembly 118 opposite the first forward axle half shaft 120. It is within the scope of this disclosure and as a non-limiting example that the second end portion 134 of the second forward axle half shaft 122 may be drivingly connected to a forward axle differential side gear, a separate stub shaft, a separate coupling shaft, a second forward axle differential output shaft, a second forward axle disconnect assembly and/or a shaft that is formed as part of a forward axle differential side gear.

As illustrated in FIG. 2 of the disclosure and as a non-limiting example, the rear drive unit assembly 104 includes a rear drive unit motor 136 that is drivingly connected to a rear drive unit motor output shaft 138. The rear drive unit motor output shaft 138 of the vehicle 100 extends from the rear drive unit motor 136 toward a rear dive unit gear assembly 140 of the rear drive unit assembly 104. In accordance with the embodiment of the disclosure illustrated in FIG. 2 and as a non-limiting example, the rear drive unit motor 136 of the rear drive unit assembly 104 provides the rotational power needed to drive the rear axle system 108 of the vehicle 100. It is within the scope of this disclosure and as a non-limiting example that the rear drive unit motor 136 of the vehicle 100 may be an electric motor and/or any other type of motor that is able to convert an amount of electrical energy into an amount of mechanical energy.

Drivingly connected to an end of the rear drive unit motor output shaft 138, opposite the rear drive unit motor 136, is the rear dive unit gear assembly 140 of the rear drive unit assembly 104. The rear dive unit gear assembly 140 of the rear drive unit assembly 104 of the vehicle 100 is a set of gears that selectively reduces the overall amount of rotational speed generated by the rear drive unit motor 136 while increasing the overall amount of torque generated by the rear drive unit motor 136. It is within the scope of this disclosure and as a non-limiting example, that the rear dive unit gear assembly 140 may be a planetary gear assembly according to an embodiment of the disclosure.

In accordance with an embodiment of the disclosure and as a non-limiting example, at least a portion of an end of the rear drive unit motor output shaft 138, opposite the rear drive unit motor 136, may be drivingly connected to the rear dive unit gear assembly 140 of the rear drive unit assembly 104 by using a gear assembly input shaft 142. As illustrated in FIG. 2 of the disclosure and as a non-limiting example, the end of the gear assembly input shaft 142, opposite the rear drive unit motor output shaft 138, is drivingly connected to at least a portion of the rear dive unit gear assembly 140 of the rear drive unit assembly 104 of the vehicle 100. According to an alternative embodiment of the disclosure (not shown) and as a non-limiting example, at least a portion of an end of the rear drive unit motor output shaft 138, opposite the rear drive unit motor 136, may be directly drivingly connected to at least a portion of the rear dive unit gear assembly 140 of the rear drive unit assembly 104.

Drivingly connected to at least a portion of the rear dive unit gear assembly 140 of the rear drive unit assembly 104 is a rear axle differential assembly 143 of the rear axle system 108 of the vehicle 100. The rear axle differential assembly 143 is a set of gears that allows the outer drive wheel(s) of the vehicle 100 to rotate at a faster rate that the inner drive wheel(s). The rotational power is transmitted through the rear axle system 108 as described in more detail below.

As illustrated in FIG. 2 of the disclosure and as a non-limiting example, the rear axle system 108 further includes a first rear axle half shaft 144 and a second rear axle half shaft 146. At least a portion of a first end portion 148 of the first rear axle half shaft 144 is drivingly connected to at least a portion of a first rear axle wheel assembly 150 and at least a portion of a second end portion 152 of the first rear axle half shaft 144 is drivingly connected to an end of the rear axle differential assembly 143. As a non-limiting example, the second end portion 152 of the first rear axle half shaft 144 may be drivingly connected to a rear axle differential side gear, a separate stub shaft, a separate coupling shaft, a first rear axle differential output shaft, a first rear axle disconnect assembly and/or a shaft that is formed as part of a rear axle differential side gear.

At least a portion of a first end portion 154 of the second rear axle half shaft 146 is drivingly connected to at least a portion of a second rear axle wheel assembly 156 of the vehicle 100. As illustrated in FIG. 2 of the disclosure and as a non-limiting example, at least a portion of a second end portion 158 of the second rear axle half shaft 146 is drivingly connected to an end of the rear axle differential assembly 143 opposite the first rear axle half shaft 144. It is within the scope of this disclosure and as a non-limiting example that the second end portion 158 of the second rear axle half shaft 146 may be drivingly connected to a rear axle differential side gear, a separate stub shaft, a separate coupling shaft, a second rear axle differential output shaft, a second rear axle disconnect assembly and/or a shaft that is formed as part of a rear axle differential side gear.

Figure 3:
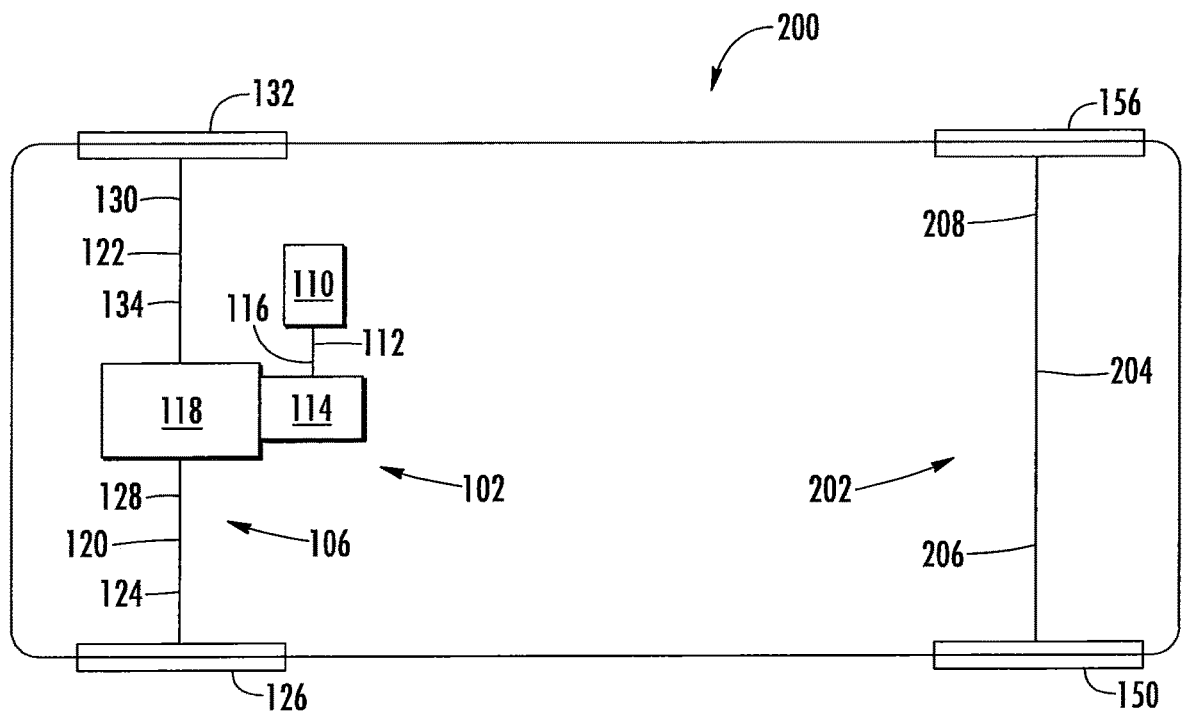
FIG. 3 is a schematic top-plan view of yet another vehicle having a drive unit assembly according to an embodiment of the disclosure.

FIG. 3 is a schematic top-plan view of yet another vehicle 200 having a drive unit assembly according to an embodiment of the disclosure. The vehicle 200 illustrated in FIG. 3 is the same as the vehicle 100 illustrated in FIG. 2 of the disclosure, except where specifically noted below. In accordance with the embodiment of the disclosure illustrated in FIG. 3 and as a non-limiting example, the vehicle 200 includes the forward drive unit assembly 102 illustrated in FIG. 2 but not the rear drive unit assembly 104 illustrated in FIG. 2 of the disclosure. As a result, the vehicle 200 illustrated in FIG. 3 is a front wheel drive electric vehicle with the forward drive unit assembly 102 being the primary drive unit for the vehicle 200.

According to the embodiment of the disclosure illustrated in FIG. 3 and as a non-limiting example, the vehicle 200 further includes a rear axle system 202 having a rear axle 204. Drivingly connected to at least a portion of a first end portion 206 of the rear axle 204 of the vehicle 200 is at least a portion of the first rear axle wheel assembly 150. As illustrated in FIG. 3 of the disclosure and as a non-limiting example, drivingly connected to at least a portion of a second end portion 208 of the rear axle 204 is at least a portion of the second rear axle wheel assembly 156 of the vehicle 200.

Figure 4:
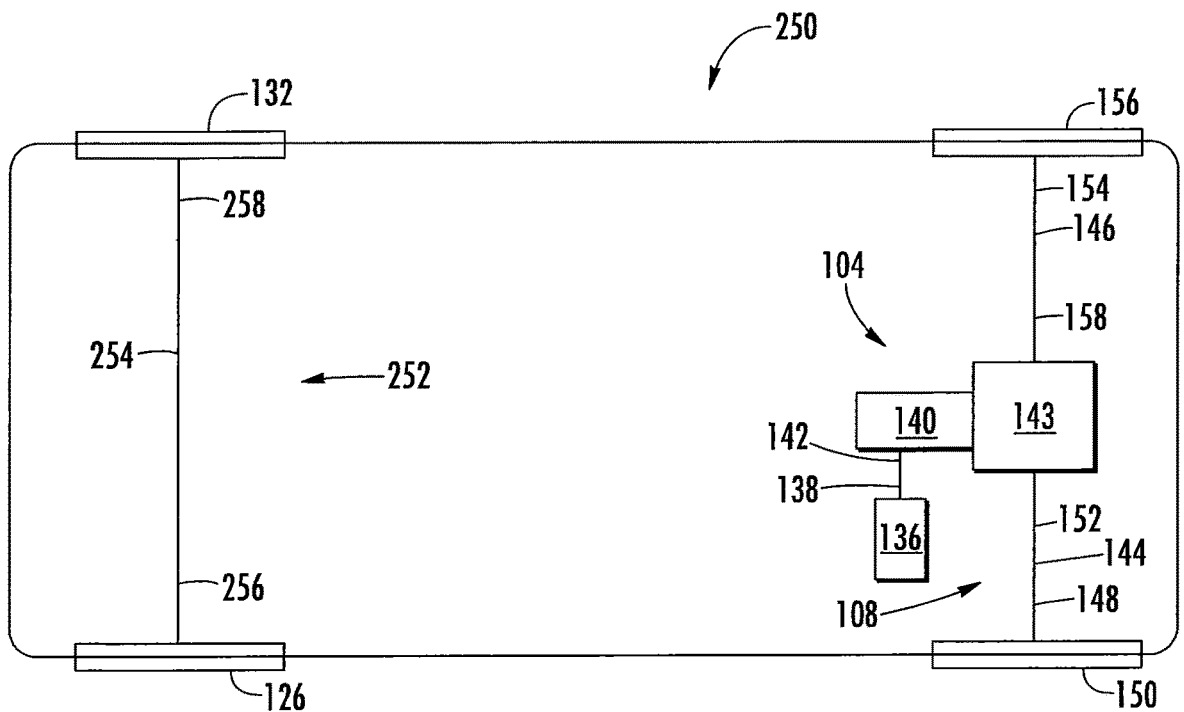
FIG. 4 is a schematic top-plan view of still yet another vehicle having a drive unit assembly according to an embodiment of the disclosure.

FIG. 4 is a schematic top-plan view of yet another vehicle 250 having a drive unit assembly according to an embodiment of the disclosure. The vehicle 250 illustrated in FIG. 4 is the same as the vehicles 100 and 200 illustrated in FIGS. 2 and 3 of the disclosure, except where specifically noted below. In accordance with the embodiment of the disclosure illustrated in FIG. 4 and as a non-limiting example, the vehicle 250 includes the rear drive unit assembly 104 illustrated in FIG. 2 but not the front drive unit assembly 104 illustrated in FIGS. 2 and 3 of the disclosure. As a result, the vehicle 250 illustrated in FIG. 4 is a rear wheel drive electric vehicle with the rear drive unit assembly 104 being the primary drive unit for the vehicle 250.

According to the embodiment of the disclosure illustrated in FIG. 3 and as a non-limiting example, the vehicle 250 further includes a forward axle system 252 having a forward axle 254. Drivingly connected to at least a portion of a first end portion 356 of the forward axle 254 of the vehicle 250 is at least a portion of the first forward axle wheel assembly 126. As illustrated in FIG. 4 of the disclosure and as a non-limiting example, drivingly connected to at least a portion of a second end portion 258 of the forward axle 254 is at least a portion of the second forward axle wheel assembly 132 of the vehicle 250.

Figure 5:
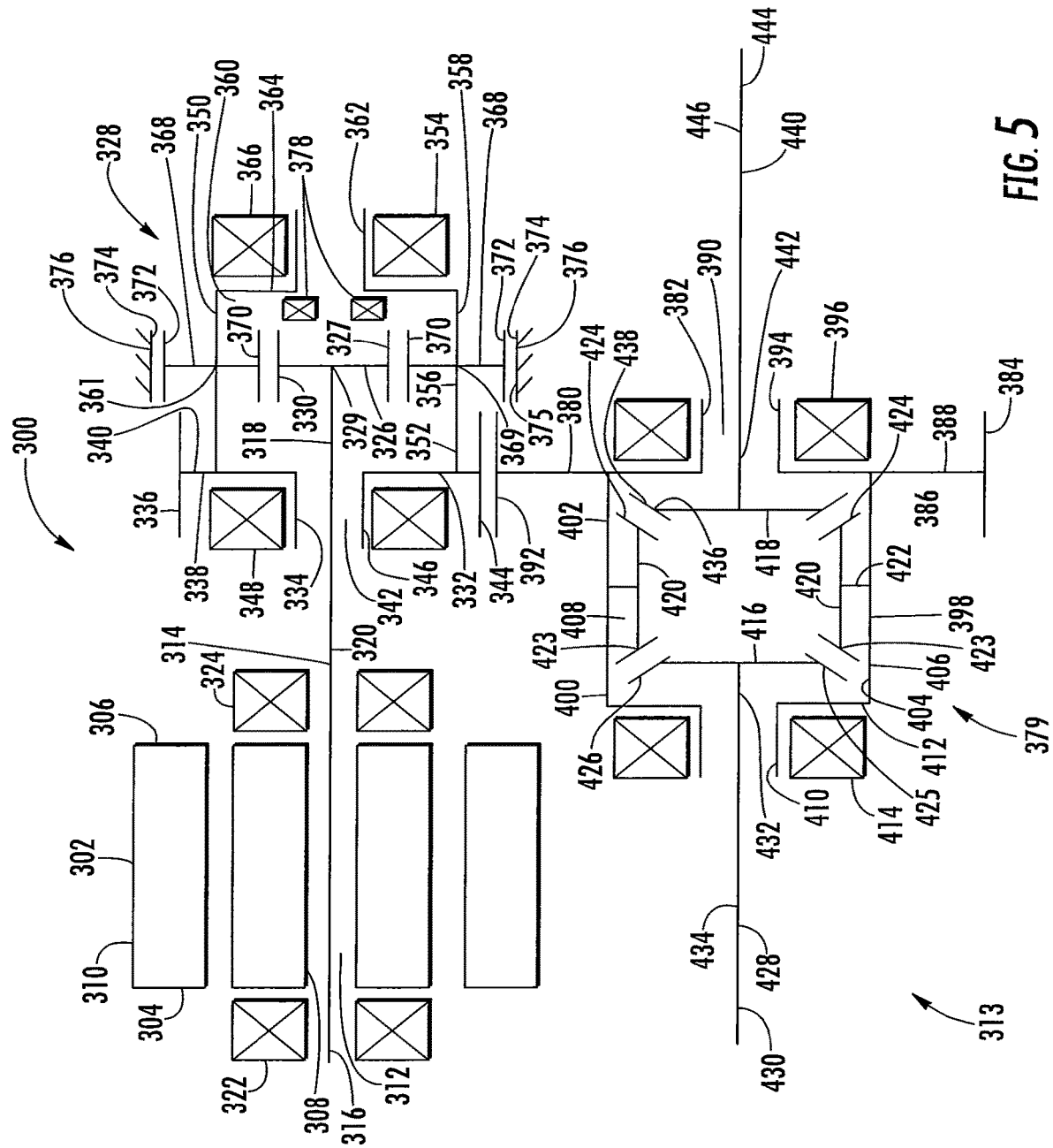
FIG. 5 is a schematic top-plan view of a drive unit assembly according to an embodiment of the disclosure with an integrated motor.

FIG. 5 is a schematic top-plan view of a drive unit assembly 300 according to an embodiment of the disclosure. As illustrated in FIG. 5 of the disclosure and as a non-limiting example, the drive unit assembly 300 includes a motor 302 having a first end 304, a second end 306, an inner surface 308 and an outer surface 310. The inner surface 308 and the outer surface 310 of the motor 302 defines a hollow portion 312 therein. In accordance with the embodiment of the disclosure illustrated in FIG. 5 and as a non-limiting example, the motor 302 provides the rotational power needed to drive an axle system 313 of a vehicle (not shown). As a non-limiting example, the motor 302 of the dive unit assembly 300 may be an electric motor and/or any other type of motor that us able to convert an amount of electrical energy into an amount of mechanical energy. It is therefore within the scope of this disclosure and as a non-limiting example that the drive unit assembly 300 illustrated in FIG. 5 may be a forward drive unit assembly that drives a forward axle system and/or a rear drive unit assembly that drives a rear axle system of a vehicle (not shown).

Extending co-axially with the motor 302 of the drive unit assembly 300 is a motor spindle or a motor output shaft 314 having a first end portion 316 a second end portion 318 and an outer surface 320. At least a portion of the inner surface 308 of the motor 302 is drivingly connected to at least a portion of the outer surface 320 of the first end portion 316 of the motor spindle or motor output shaft 314.

As illustrated in FIG. 5 of the disclosure and as a non-limiting example, the motor spindle or motor output shaft 314 of the motor 302 may be rotationally supported by a first motor spindle or motor output shaft bearing 322 and/or a second motor spindle or motor output shaft bearing 324. The first motor spindle or motor output shaft bearing 322 and the second motor spindle or motor output shaft bearing 324 of the drive unit assembly 300 extend co-axially with and are in direct contact with at least a portion of the outer surface 320 of the motor spindle or motor output shaft 314. In accordance with the embodiment of the disclosure illustrated in FIG. 5 and as a non-limiting example, at least a portion of the first motor spindle or motor output shaft bearing 322 is disposed axially outboard from and is adjacent to the first end 304 of the motor 302. Additionally, in accordance with the embodiment of the disclosure illustrated in FIG. 5 of the disclosure and as a non-limiting example, at least a portion of the second motor spindle or motor output shaft bearing 324 is disposed axially outboard from and is adjacent to at least a portion of the second end 306 of the motor 302 of the drive unit assembly 300. It is within the scope of this disclosure and as a non-limiting example that the first and/or second motor spindle or motor output shaft bearings 322 and/or 324 may be a bushing, a tapered roller bearing, a roller bearing, a rolling element bearing and/or a needle bearing.

Drivingly connected to at least a portion of the second end portion 318 of the motor spindle or motor output shaft 314 is a sun gear 326 of a gear assembly 328. The sun gear 326 of the gear assembly 328 extends co-axially with the motor spindle or motor output shaft 314. Circumferentially extending from at least a portion of an outer surface 327 of the sun gear 326 is a plurality of sun gear teeth 330. It is within the scope of this disclosure and as a non-limiting example, the plurality of sun gear teeth 330 extending from the outer surface 327 of the sun gear 326 may be a plurality of hypoid gear teeth, spiral bevel gear teeth, helical gear teeth, spur gear teeth, double hypoid gear teeth, double spiral bevel gear teeth and/or double helical gear teeth. Additionally, it is within the scope of this disclosure and as a non-limiting example that the gear assembly 328 may be a planetary gear assembly.

According to an embodiment of the disclosure and as a non-limiting example, the sun gear 326 of the gear assembly 328 may be a separate component from the motor spindle or motor output shaft 314. In accordance with this embodiment of the scope of this disclosure and as a non-limiting example, at least a portion of an inner surface 329 of the sun gear 326 may be integrally connected to at least a portion of the second end portion of the motor spindle or motor output shaft 314 of the motor 302 of the drive unit assembly 300. It is within the scope of this disclosure and as a non-limiting example that at least a portion of the inner surface 329 of the sun gear 326 of the gear assembly 328 may be integrally connected to at least a portion of the second end portion 318 of the motor spindle or motor output shaft 314 by using one or more welds, one or more mechanical fasteners, one or more adhesives, a spline connection and/or a threaded connection.

In accordance with an alternative embodiment of the disclosure and as a non-limiting example, the sun gear 326 of the gear assembly 328 may be integrally formed as part of the second end portion 318 of the motor spindle or motor output shaft 314 of the drive unit assembly 300. According to this embodiment of the disclosure and as a non-limiting example, the sun gear 326 may be cast as part of the motor spindle or motor output shaft 314 and/or machined into at least a portion of the second end portion 318 of the motor spindle or motor output shaft 314.

Interposed between the motor 302 and the sun gear 326 of the drive unit assembly 300 is a pinion gear 332. The pinion gear 332 of the gear assembly 328 extends co-axially with the motor spindle or motor output shaft 314 of the motor 302 of the drive unit assembly 300. As illustrated in FIG. 5 of the disclosure and as a non-limiting example, the pinion gear 332 has an inner surface 334, an outer surface 336, a first side 338 and a second side 340. The inner surface 334 and the outer surface 336 of the pinion gear 332 defines a hollow portion 342 therein having a size and shape to as to receive and/or retain at least a portion of the motor spindle or motor output shaft 314 of the drive unit assembly 300. Circumferentially extending from at least a portion of the outer surface 336 of the pinion gear 332 is a plurality of pinion gear teeth 344. It is within the scope of this disclosure and as a non-limiting example that the plurality of pinion gear teeth 344 extending from the outer surface 336 of the pinion gear 332 may be a plurality of hypoid gear teeth, spiral bevel gear teeth, helical gear teeth, spur gear teeth, double hypoid gear teeth, double spiral bevel gear teeth and/or double helical gear teeth.

A protruding portion 346 extends axially outboard from at least a portion of the first side 338 of the pinion gear 332 toward the motor 302 of the drive unit assembly 300. The protruding portion 346 of the pinion gear 332 extends co-axially with the motor spindle or motor output shaft 314 of the drive unit assembly 300. As illustrated in FIG. 5 of the disclosure and as a non-limiting example, the protruding portion 346 of the pinion gear 332 is substantially cylindrical in shape.

Disposed radially outboard from and adjacent to at least a portion of the protruding portion 346 of the pinion gear 332 is one or more pinion gear bearings 348. The pinion gear bearing 348 of the drive unit assembly 300 provides rotational and/or axial load support for the pinion gear 332 of the gear assembly 328 when in operation. It is within the scope of this disclosure and as a non-limiting example that the one or more pinion gear bearings 348 of the drive unit assembly 300 may be one or more bushings, one or more tapered roller bearings, one or more roller bearings, one or more rolling element bearings and/or one or more needle bearings.

Integrally connected to at least a portion of the second side 340 of the pinion gear 332 is a gear assembly housing 350 having a first end portion 352, a second end portion 354, an inner surface 356 and an outer surface 358. The inner surface 356 and the outer surface 356 of the gear assembly housing 350 defines a hollow portion 360 therein. The hollow portion 360 of the gear assembly housing 350 is of a size and shape to receive and/or retain at least a portion of the gear assembly 328 of the drive unit assembly 300. As illustrated in FIG. 5 of the disclosure and as a non-limiting example, the gear assembly housing 350 of the drive unit assembly 300 extends co-axially with the motor spindle or motor output shaft 314 and axially outboard from at least a portion of the second side 340 of the pinion gear 332. It is within the scope of this disclosure and as a non-limiting example, that the gear assembly housing 350 may be made of a single integrally formed member or made of a plurality of pieces that are integrally connected to one another for form the gear assembly housing 350 illustrated in FIG. 5 of the disclosure. According to an embodiment of the disclosure and as a non-limiting example, at least a portion of the first end portion 352 of the gear assembly housing 350 may be attached to at least a portion of the second side 340 of the pinion gear 332 by using one or more welds, one or more mechanical fasteners, one or more adhesives and/or by using a threaded connection. In accordance with an alternative embodiment of the disclosure and as a non-limiting example, at least a portion of the first end portion 352 of the gear assembly housing 350 may be integrally formed as part of the second side 340 of the pinion gear 332.

At least a portion of the second end portion 354 of the gear assembly housing 350 has a reduced diameter portion 362. Connecting at least a portion of the reduced diameter portion 362 of the gear assembly housing 350 to an outermost surface of the gear assembly housing 350, is a radially extending wall portion 364. In accordance with the embodiment of the disclosure illustrated in FIG. 5 and as a non-limiting example, the reduced diameter portion 362 of the gear assembly housing 350 is substantially cylindrical in shape. It is within the scope of this disclosure and as a non-limiting example that the reduced diameter portion 362 of the second end portion 354 of the gear assembly housing 350 may be solid or at least partially hollow.

As illustrated in FIG. 5 of the disclosure an as a non-limiting example, one or more gear housing bearings 366 are disposed radially outboard from at least a portion of the outer surface of the outer surface 358 of the reduced diameter portion 362 of the gear assembly housing 350 of the drive unit assembly 300. The one or more gear housing bearings 366 of the drive unit assembly 300 provide rotational support and/or axial load support for at least a portion of the second end portion 354 of the gear assembly housing 350. It is within the scope of this disclosure and as a non-limiting example that the one or more gear housing bearings 366 may be one or more bushings, one or more tapered roller bearings, one or more roller bearings, one or more rolling element bearings and/or one or more needle bearings.

Disposed radially outboard from and drivingly connected to least a portion of the sun gear 326 of the gear assembly 328 is one or more planetary gears 368 having an inner surface 369 and an outer surface 370 defining a hollow portion (not shown) therein. At least a portion of the inner surface 369 of the one or more planetary gears 368 of the gear assembly 328 are rotatively and drivingly connected to at least a portion of the gear assembly housing 350. As a result, at least a portion of the motor 302, the motor spindle or motor output shaft 314, the sun gear 326 and/or the gear assembly housing 350 is drivingly connected to at least a portion of the second side 340 of the pinion gear 332 of the gear assembly 328 of the drive unit assembly 300. It is within the scope of this disclosure and as a non-limiting example that the one or more planetary gears 368 may be rotatively and drivingly connected to the gear assembly housing 350 by using one or more rods (not shown), pins (not shown), bolts (not shown) and/or mechanical fasteners (not shown) that are then integrally connected to at least a portion of the gear assembly housing 350.

Circumferentially extending from at least a portion of the outer surface 370 of the one or more planetary gears 368 of the gear assembly 328 is a plurality of planetary gear teeth 372. The plurality of planetary gear teeth 372 extending from the outer surface 370 of the one or more planetary gears 368 are complementary to and meshingly engaged with the plurality of sun gear teeth 330 extending from the outer surface 327 of the sun gear 326. As a non-limiting example, the plurality of planetary gear teeth 372 extending from the outer surface 370 of the one or more planetary gears 368 may be a plurality of hypoid gear teeth, spiral bevel gear teeth, helical gear teeth, spur gear teeth, double hypoid gear teeth, double spiral bevel gear teeth or double helical gear teeth.

As best seen in FIG. 5 of the disclosure and as a non-limiting example, at least a portion of the one or more planetary gears 368 extend outside the gear assembly housing 350 through at least a portion of one or more gear housing openings 361 extending from the inner surface 356 to the outer surface 358 of the gear assembly housing 350. The one or more planetary gears 368 of the gear assembly 328 extend outside the gear assembly housing 350 until at least a portion of the plurality of planetary gear teeth 372 on the outer surface 370 of the one or more planetary gears 368 are meshingly engaged with a complementary plurality of gear teeth 374 circumferentially extending from at least a portion of an inner surface 375 of a drive unit housing 376. The plurality of gear teeth 374 extending from the inner surface 375 of the drive unit housing 376 form a planetary ring gear for the gear assembly 328 of the drive unit assembly 300. It is within the scope of this disclosure and as a non-limiting example, that the plurality of gear teeth 374 extending from the inner surface 375 of the drive unit housing 376 may be a plurality of hypoid gear teeth, spiral bevel gear teeth, helical gear teeth, spur gear teeth, double hypoid gear teeth, double spiral bevel gear teeth or double helical gear teeth.

Disposed axially outboard from at least a portion of the sun gear 326 of the gear assembly 328 and interposed between the sun gear 326 and the inner surface 356 of the radially extending wall portion 364 of the second end portion 354 of the gear assembly housing 350 is one or more sun gear bearings 378. The one or more sun gear bearings 378 of the gear assembly 328 provides rotational support and/or axial load support for at least a portion of the sun gear 326 when in operation. As a result, the one or more sun gear bearings 378 allow for the sun gear 326 of the gear assembly 328 to be a floating sun gear. By providing the gear assembly 328 of the drive unit assembly 300 with a floating sun gear 326, it aids in improving the overall load sharing between the one or more planetary gears 368, it reduces the overall amount of noise vibration and harshness (NVH) experienced by the gear assembly 328 and it improves the overall life and durability of the drive unit assembly 300.

Disposed radially outboard from at least a portion of the pinion gear 332 of the gear assembly 328 is a differential assembly 379 having a differential ring gear 380 having an inner surface 382, an outer surface 384, a first side 386 and a second side 388. The inner surface 382 and the outer surface 384 of the differential ring gear 380 defines a hollow portion 390 therein. In accordance with the embodiment of the disclosure illustrated in FIG. 5 and as a non-limiting example, at least a portion of the motor 302 and the motor spindle or motor output shaft 314 of the drive unit assembly 300 extend transverse to the differential assembly 379 of the drive unit assembly 300. Circumferentially extending from at least a portion of the outer surface 384 of the differential ring gear 380 is a plurality of ring gear teeth 392 that are complementary to and meshingly engaged with the plurality of pinion gear teeth 334 extending from the outer surface 336 of the pinion gear 332. As a non-limiting example, the plurality of ring gear teeth 392 extending from the outer surface 384 of the differential ring gear 380 are a plurality of hypoid gear teeth, spiral bevel gear teeth, helical gear teeth, spur gear teeth, double hypoid gear teeth, double spiral bevel gear teeth or double helical gear teeth.

Extending axially outboard from at least a portion of the second side 388 of the differential ring gear 380 of the drive unit assembly 300 is a protruding portion 394. As best seen in FIG. 5 of the disclosure and as a non-limiting example, the protruding portion 394 of the differential ring gear 380 is substantially cylindrical in shape.

Disposed radially outboard from at least a portion of the outer surface 384 of the protruding portion 394 of the differential ring gear 380 and axially outboard from at least a portion of the second side 388 of the differential ring gear 380, is one or more differential ring gear bearings 396. The one or more differential ring gear bearings 396 provide rotational support and/or axial load support for at least a portion of the differential ring gear 380 when in operation. It is within the scope of this disclosure and as a non-limiting example that the one or more differential ring gear bearings 396 of the drive unit assembly 300 may be one or more bushings, one or more tapered roller bearings, one or more roller bearings, one or more rolling element bearings and/or one or more needle bearings.

A differential case 398 having a first end portion 400, a second end portion 402, an inner surface 404 and an outer surface 406 extends axially outboard from and is adjacent to at least a portion of the first side 386 of the differential ring gear 380 of the drive unit assembly 300. The inner surface 404 and the outer surface 406 of the differential case 398 defines a hollow portion 408 therein. As illustrated in FIG. 5 of the disclosure and as a non-limiting example, at least a portion of the second end portion 402 of the differential case 398 is integrally connected to at least a portion of the first side 386 of the differential ring gear 380. In accordance with an embodiment of the disclosure and as a non-limiting example, at least a portion of the second end portion 402 of the differential case 398 may be integrally connected to at least a portion of the first side 386 of the differential ring gear 380 by using one or more welds, one or more adhesives, one or more mechanical fasteners and/or a threaded connection. In accordance with an alternative embodiment of the disclosure and as a non-limiting example, at least a portion of the second end portion 402 of the differential case 398 of the differential assembly 379 may be integrally formed as part of the first side 386 of the differential ring gear 380.

According to an alternative embodiment of the disclosure (not shown) and as a non-limiting example, at least a portion of the first end portion of the differential case may be integrally connected to at least a portion of the second side of the differential ring gear of the drive unit assembly. As a result, it is within the scope of this disclosure that the differential case of the differential assembly may be integrally connected to the opposite side of the differential ring gear than illustrated in FIG. 5 of the disclosure. As previously discussed, it is within the scope of this disclosure and as a non-limiting example that at least a portion of the first end portion of the differential case may be integrally connected to at least a portion of the second side of the differential ring gear by using one or more welds, one or more adhesives, one or more mechanical fasteners and/or a threaded connection. Additionally, as previously discussed, it is within the scope of this disclosure and as a non-limiting example that at least a portion of the first end portion of the differential case may be integrally formed as part of the second side of the differential ring gear.

Additionally, in accordance with this embodiment of the disclosure (not shown) and as a non-limiting example, the protruding portion of the differential ring gear extends axially outboard from at least a portion of the first side of the differential ring gear. At least a portion of the one or more differential ring gear bearings are disposed radially outboard from at least a portion of the protruding portion of the differential ring gear and axially outboard from at least a portion of the first side of the differential ring gear.

In accordance with the embodiment of the disclosure illustrated in FIG. 5 and as a non-limiting example, at least a portion of the first end portion 400 of the differential case 398 has a reduced diameter portion 410. Connecting at least a portion of the reduced diameter portion 410 of the differential case 398 to an outermost surface of the differential case 398, is a radially extending wall portion 412. It is within the scope of this disclosure and as a non-limiting example that the reduced diameter portion 410 of the first end portion 400 of the differential case 398 may be substantially cylindrical in shape.

One or more differential case bearings 414 are disposed radially outboard from at least a portion of the reduced diameter portion 410 of the differential case 398. The one or more differential case bearings 414 of the drive unit assembly 300 provides rotational support and/or axial load support for at least a portion of the first end portion 400 of the differential case 398 when in operation. It is within the scope of this disclosure and as a non-limiting example that the one or more differential case bearings 414 may be one or more bushings, one or more tapered roller bearings, one or more roller bearings, one or more rolling element bearings and/or one or more needle bearings.

Disposed within at least a portion of the hollow portion 390 of the differential case 398 of the differential assembly 379 is a first side gear 416, a second side gear 418 and one or more bevel gears 420. As illustrated in FIG. 5 of the disclosure and as a non-limiting example, at least a portion of the one or more bevel gears 420 of the differential assembly 379 are rotatively and drivingly connected to at least a portion of the differential case 398 via one or more connecting members 422. Circumferentially extending from at least a portion of an outer surface 423 of the one or more bevel gears 420 of the differential assembly 379 is a plurality of bevel gear teeth 424. It is within the scope of this disclosure and as a non-limiting example that the plurality of bevel gear teeth 424 extending from the outer surface 423 of the one or more bevel gears 420 may be a plurality of hypoid gear teeth, spiral bevel gear teeth, helical gear teeth, spur gear teeth, double hypoid gear teeth, double spiral bevel gear teeth or double helical gear teeth.

As illustrated in FIG. 5 of the disclosure and as a non-limiting example, at least a portion of the first and second side gears 416 and 418 of the differential assembly 379 are disposed axially outboard from and are drivingly connected to at least a portion of the one or more bevel gears 420 of the differential assembly 379. In accordance with the embodiment of the disclosure illustrated in FIG. 5 and as a non-limiting example, at least a portion of the first side gear 416 of the differential assembly 379 is interposed between the one or more bevel gears 420 and the radially extending wall portion 412 of the differential case 398. Circumferentially extending from at least a portion of an outer surface 425 of the first differential side gear 416 is a plurality of first side gear teeth 426 that are complementary to and meshingly engaged with the plurality of bevel gear teeth 424 on the outer surface 423 of the one or more bevel gears 420. It is within the scope of this disclosure and as a non-limiting example that the plurality of first side gear teeth 426 extending from the outer surface 425 of the first differential side gear 416 may be a plurality of hypoid gear teeth, spiral bevel gear teeth, helical gear teeth, spur gear teeth, double hypoid gear teeth, double spiral bevel gear teeth or double helical gear teeth.

Extending co-axially with the first side gear 416 and the differential ring gear 380 of the differential assembly 379 of the drive unit assembly 300 is a first shaft 428 having a first end portion 430, a second end portion 432 and an outer surface 434. As illustrated in FIG. 5 of the disclosure and as a non-limiting example, at least a portion of the first shaft 428 extends from within the hollow portion 480 of the differential case 398 to a point outside the differential case 398 of the differential assembly 379. At least a portion of the first end portion 430 of the first shaft 428 is drivingly connected to at least a portion of a first wheel assembly (not shown). It is within the scope of this disclosure and as a non-limiting example that the first shaft 428 of the drive unit assembly 300 may be a first axle half shaft, a first forward axle half shaft or a first rear axle half shaft.

Drivingly connected to at least a portion of the first side gear 416 of the differential assembly 379 is at least a portion of the second end portion 432 of the first shaft 428 of the drive unit assembly 300. According to an embodiment of the disclosure and as a non-limiting example, at least a portion of the second end portion 432 of the first shaft 428 may be integrally connected to at least a portion of the first side gear 416 of the differential assembly 379 by using one or more welds, one or more mechanical fasteners, one or more adhesives, a spline connection, a press-fit connection, a threaded connection and/or a first shaft connect and disconnect assembly. In accordance with an alternative embodiment of the disclosure and as a non-limiting example, at least a portion of the second end portion 432 of the first shaft 428 of the drive unit assembly 300 may be integrally formed as part of the first side gear 416 of the differential assembly 379.

As illustrated in FIG. 5 of the disclosure and as a non-limiting example, at least a portion of the second side gear 418 of the differential assembly 379 is interposed between the one or more bevel gears 420 and the first side 386 of the differential ring gear 380 of the drive unit assembly 300. Circumferentially extending from at least a portion of an outer surface 436 of the second differential side gear 418 is a plurality of second side gear teeth 438 that are complementary to and meshingly engaged with the plurality of bevel gear teeth 424 on the outer surface 423 of the one or more bevel gears 420. It is within the scope of this disclosure and as a non-limiting example that the plurality of second side gear teeth 438 extending from the outer surface 436 of the second differential side gear 418 may be a plurality of hypoid gear teeth, spiral bevel gear teeth, helical gear teeth, spur gear teeth, double hypoid gear teeth, double spiral bevel gear teeth or double helical gear teeth.

Extending co-axially with the second side gear 418 and the differential ring gear 380 of the differential assembly 379 is a second shaft 440 having a first end portion 442, a second end portion 444 and an outer surface 446. As illustrated in FIG. 5 of the disclosure and as a non-limiting example, at least a portion of the second shaft 440 extends from within the hollow portion 480 of the differential case 398 and through the hollow portion 390 of the differential ring gear 380 to a point outside the differential case 398 of the differential assembly 379. At least a portion of the second end portion 444 of the second shaft 440 is drivingly connected to at least a portion of a second wheel assembly (not shown). It is within the scope of this disclosure and as a non-limiting example that the second shaft 440 of the drive unit assembly 300 may be a second axle half shaft, a second forward axle half shaft or a second rear axle half shaft.

Drivingly connected to at least a portion of the second side gear 418 of the differential assembly 379 is at least a portion of the first end portion 442 of the second shaft 440 of the drive unit assembly 300. According to an embodiment of the disclosure and as a non-limiting example, at least a portion of the first end portion 442 of the second shaft 440 may be integrally connected to at least a portion of the second side gear 418 of the differential assembly 379 by using one or more welds, one or more mechanical fasteners, one or more adhesives, a spline connection, a press-fit connection, a threaded connection and/or a second shaft connect and disconnect assembly. In accordance with an alternative embodiment of the disclosure and as a non-limiting example, at least a portion of the first end portion 442 of the second shaft 440 of the drive unit assembly 300 may be integrally formed as part of the second side gear 418 of the differential assembly 379.

In light of the above-disclosure, it is therefore within the scope of this disclosure that the motor 302 of the drive unit assembly 300 may be an integrated motor that forms an integral part of the drive unit assembly 300.

Figure 6:
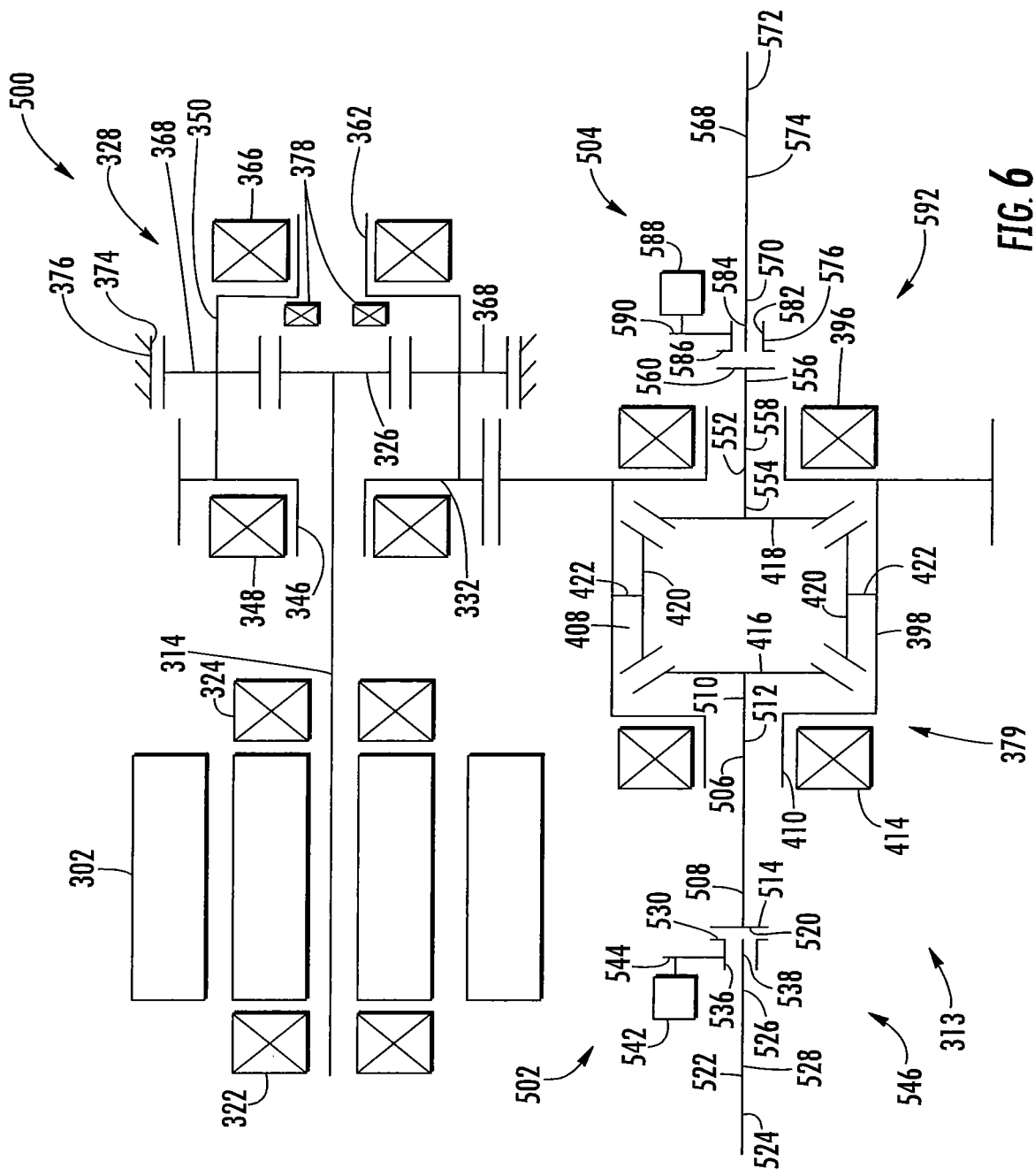
FIG. 6 is a schematic top-plan view of the drive unit assembly illustrated in FIG. 5 of the disclosure according to an alternative embodiment of the disclosure where the drive unit assembly includes one or more shaft connect and disconnect assemblies in a first position.
Figure 7:
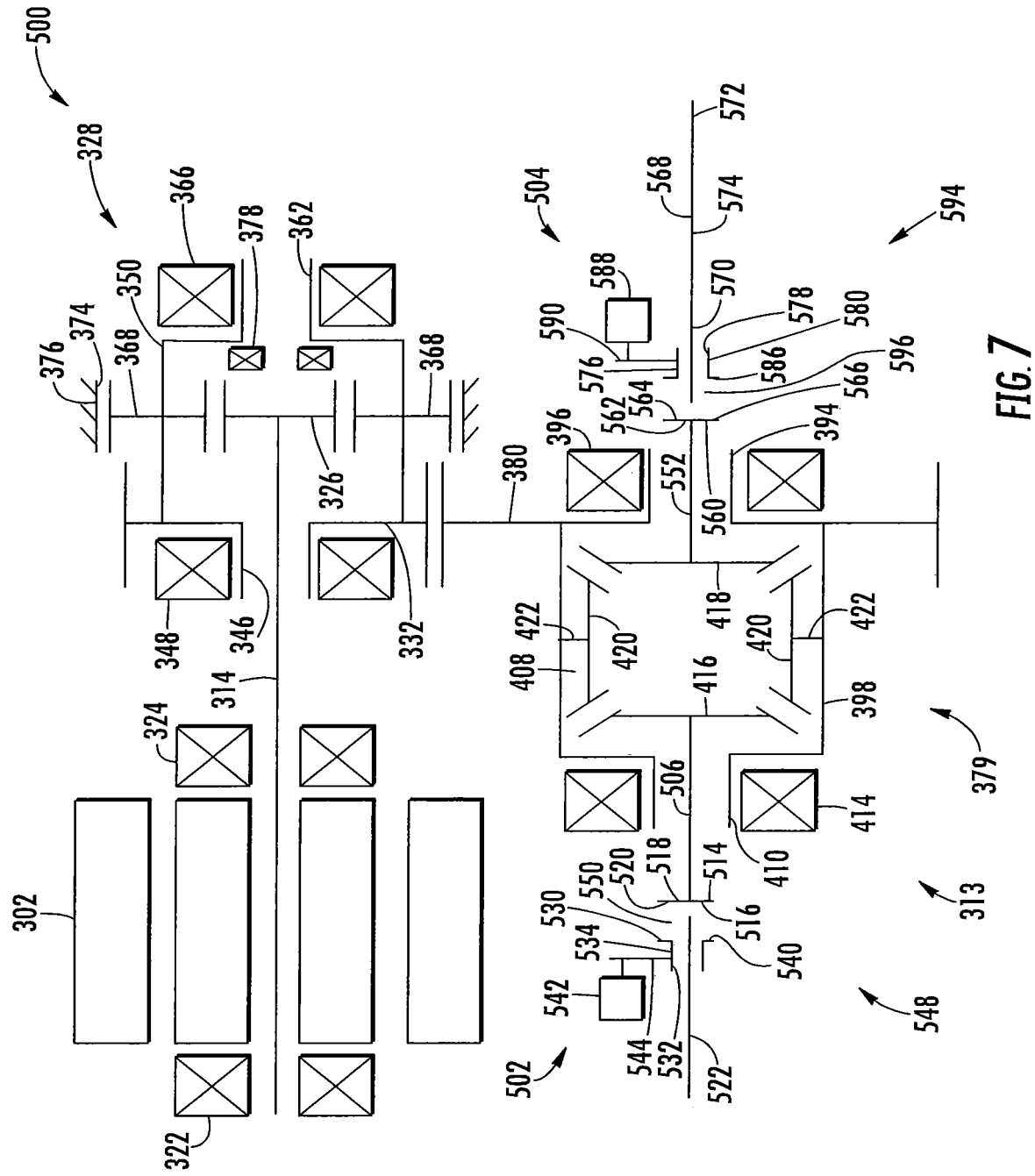
FIG. 7 is a schematic top-plan view of the drive unit assembly illustrated in FIG. 6 of the disclosure where the one or more shaft connect and disconnect assemblies are in a second position.

FIGS. 6 and 7 provide a schematic top-plan view of a drive unit assembly 500 having one or more axle connect and disconnect assemblies according to an embodiment of the disclosure. The drive unit assembly 500 illustrated in FIGS. 6 and 7 is the same as the drive unit assembly 300 illustrated in FIG. 5, except where specifically noted below. As illustrated in FIGS. 6 and 7 of the disclosure and as a non-limiting example the drive unit assembly 500 may include the use of a first shaft connect and disconnect assembly 502 and/or a second shaft connect and disconnect assembly 504.

Extending co-axially with and drivingly connected to at least a portion of the first side gear 416 of the differential assembly 379 is a first stub shaft 506 having a first end portion 508, a second end portion 510 and an outer surface 512. As illustrated in FIGS. 6 and 7 of the disclosure and as a non-limiting example, at least a portion of the first stub shaft 506 extends from within the hollow portion 408 of the differential case 398 away from the first side gear 416 to a point outside the differential case 398. At least a portion of the second end portion 510 of the first stub shaft 506 is drivingly connected to at least a portion of the first side gear 416 of the differential assembly 379. According to an embodiment of the disclosure and as a non-limiting example, at least a portion of the first side gear 416 of the differential assembly 379 may be integrally formed as part of the second end portion 510 of the first stub shaft 506 of the drive unit assembly 500. In accordance with an alternative embodiment of the disclosure and as a non-limiting example, at least a portion of the second end portion 510 of the first stub shaft 506 may be drivingly connected to at least a portion of the first side gear 416 of the differential assembly 379 by using one or more mechanical fasteners, one or more adhesives, one or more welds, a splines connection and/or a threaded connection.

Circumferentially extending from at least a portion of the outer surface 512 of the first end portion 508 of the first stub shaft 506 is an increased diameter portion 514 having a first end portion 516 and a second end portion 518. As illustrated in FIGS. 6 and 7 of the disclosure and as a non-limiting example, a plurality of first stub shaft clutch teeth 520 extend outboard from at least a portion of the first end portion 516 of the increased diameter portion 514 of the first stub shaft 506 of the drive unit assembly 500. It is within the scope of this disclosure and as a non-limiting example that the plurality of first stub shaft clutch teeth 520 may be a plurality of face clutch teeth and/or a plurality of dog clutch teeth.

Extending co-axially with and rotationally connected to the first stub shaft 506 of the drive unit assembly 500 is a first shaft 522 having a first end portion 524, a second end portion 526 and an outer surface 528. At least a portion of the first end portion 524 of the first shaft 522 is drivingly connected to at least a portion of the first wheel assembly (not shown). It is within the scope of this disclosure and as a non-limiting example that the first shaft 522 of the drive unit assembly 500 may be a first axle half shaft, a first forward axle half shaft or a first rear axle half shaft.

As illustrated in FIGS. 6 and 7 of disclosure and as a non-limiting example, at least a portion of the second end portion 526 of the first shaft 522 is rotatively connected to at least a portion of the first end portion 508 of the first stub shaft 506 of the drive unit assembly 500. It is to be understood that the rotative connection between the first shaft 523 and the first stub shaft 506 may be as a result of a male portion (not shown) being received within at least a portion of a female portion (not shown). According to an embodiment of the disclosure and as a non-limiting example, a male portion (not shown) of the second end portion 526 of the first shaft 522 may be received within at least a portion of a female portion (not shown) in the first end portion 508 of the first stub shaft 506. In accordance with an alternative embodiment of the disclosure and as a non-limiting example, a male portion (not shown) of the first end portion 508 of the first stub shaft 506 may be received within at least a portion of a female portion (not shown) in the second end portion 526 of the first shaft 522.

Disposed radially outboard from and extending co-axially with at least a portion of the first shaft 522 of the drive unit assembly 500 is the first shaft connect and disconnect assembly 502 of the drive unit assembly 500. The first shaft connect and disconnect assembly 502 allows for the selective connecting and disconnecting of the first shaft 522 with the first stub shaft 506 of the drive unit assembly 500. As a result, it is to be understood that the first shaft connect and disconnect assembly 502 of the drive unit assembly 500 may selectively connect and disconnect the first shaft 522 from the differential assembly 379 and the motor 302 of the drive unit assembly 500. By locating the first shaft connect and disconnect assembly 502 of the drive unit assembly 500 in the location illustrated in FIGS. 6 and 7 of the disclosure, it reduces the overall amount of spin loss and/or churning loss experienced by the drive unit assembly 500 thereby improving the overall life, durability and performance of the drive unit assembly 500.

As best seen in FIG. 7 of the disclosure and as a non-limiting example, the first shaft connect and disconnect assembly 502 of the drive unit assembly 500 includes a sliding collar 530 having an inner surface 532 and an outer surface 534 that is selectively engageable with at least a portion of the first stub shaft 506. The sliding collar 530 of the first shaft connect and disconnect assembly 502 extends co-axially with the first shaft 522 of the drive unit assembly 500. Circumferentially extending from at least a portion of the inner surface 532 of the sliding collar 530 is a plurality of axially extending sliding collar splines 536. The plurality of axially extending sliding collar splines 536 on the inner surface 532 of the sliding collar 530 of the first shaft connect and disconnect assembly 502 are complementary to and meshingly engaged with a plurality of axially extending first shaft splines 538 circumferentially extending from at least a portion of the outer surface 528 of the second end portion 526 of the first shaft 522.

Extending outboard from at least a portion of the outer surface 534 of the sliding collar 530 of the first shaft connect and disconnect assembly 502 is a plurality of sliding collar clutch teeth 540. The plurality of sliding collar clutch teeth 540 are complementary to and selectively engageable with the plurality of first stub shaft clutch teeth 520 of the first stub shaft 506. It is within the scope of this disclosure and as a non-limiting example the plurality of sliding collar clutch teeth 540 of the sliding collar 530 of the first shaft connect and disconnect assembly 502 may be a plurality of face clutch teeth and/or a plurality of dog clutch teeth.

Disposed radially outboard from at least a portion of the sliding collar 530 of the first shaft connect and disconnect assembly 502 of the drive unit assembly 500 is a first actuation mechanism 542 and a shift shaft 544. As illustrated in FIGS. 6 and 7 of the disclosure and as a non-limiting example, at least a portion of the shift shaft 544 is rotatively and drivingly connected with at least a portion of the outer surface 534 of the sliding collar 530 of the first shaft connect and disconnect assembly 502. Drivingly connected to at least a portion of an end of the shift shaft 544, opposite the sliding collar 530, is at least a portion of the first actuation mechanism 542 of the first shaft connect and disconnect assembly 502. As a result, the first actuation mechanism 542 is drivingly connected to at least a portion of the sliding collar 530 of the first shaft connect and disconnect assembly 502. It is within the scope of this disclosure and as a non-limiting example that the first actuation mechanism 542 may be a linear actuator mechanism, a pneumatic actuator mechanism, an electro-mechanical actuator mechanism and/or an electro-magnetic actuator mechanism.

As best seen in FIG. 6 of the disclosure and as a non-limiting example, when the first shaft connect and disconnect assembly 502 of the drive unit assembly 500 is in the position illustrated in FIG. 6, the first shaft connect and disconnect assembly 502 is in a first position 546. When the first shaft connect and disconnect assembly 502 is in the first position 546 illustrated in FIG. 6, the plurality of sliding collar clutch teeth 540 of the sliding collar 530 are meshingly engaged with the plurality of first stub shaft clutch teeth 520 of the first stub shaft 506. As a result, the first shaft 522 of the drive unit assembly 500 is drivingly connected to the first stub shaft 506 which in turn drivingly connects the motor 302, the gear assembly 328 and the differential assembly 379 with the first shaft 522.

As best seen in FIG. 7 of the disclosure and as a non-limiting example, when the first shaft connect and disconnect assembly 502 of the drive unit assembly 500 is in the position illustrated in FIG. 7, the first shaft connect and disconnect assembly 502 is in a second position 548. When the first shaft connect and disconnect assembly 502 is in the second position 548 illustrated in FIG. 7, the plurality of sliding collar clutch teeth 540 of the sliding collar 530 are not meshingly engaged with the plurality of first stub shaft clutch teeth 520 of the first stub shaft 506 defining a gap 550 therebetween. As a result, the first shaft 522 of the drive unit assembly 500 is drivingly disconnected from the first stub shaft 506 which in turn drivingly disconnects the motor 302, the gear assembly 328 and the differential assembly 379 from driving engagement with the first shaft 522.

Extending co-axially with and drivingly connected to at least a portion of the second side gear 418 of the differential assembly 379 is a second stub shaft 552 having a first end portion 554, a second end portion 556 and an outer surface 558. As illustrated in FIGS. 6 and 7 of the disclosure and as a non-limiting example, at least a portion of the second stub shaft 552 extends from within the hollow portion 408 of the differential case 398 away from the second side gear 418 to a point outside the differential case 398. At least a portion of the first end portion 554 of the second stub shaft 552 is drivingly connected to at least a portion of the second side gear 418 of the differential assembly 379. According to an embodiment of the disclosure and as a non-limiting example, at least a portion of the second side gear 418 of the differential assembly 379 may be integrally formed as part of the first end portion 554 of the second stub shaft 552 of the drive unit assembly 500. In accordance with an alternative embodiment of the disclosure and as a non-limiting example, at least a portion of the first end portion 554 of the second stub shaft 552 may be drivingly connected to at least a portion of the second side gear 418 of the differential assembly 379 by using one or more mechanical fasteners, one or more adhesives, one or more welds, a splines connection and/or a threaded connection.

Circumferentially extending from at least a portion of the outer surface 558 of the second end portion 556 of the second stub shaft 552 is an increased diameter portion 560 having a first end portion 562 and a second end portion 564. As illustrated in FIGS. 6 and 7 of the disclosure and as a non-limiting example, a plurality of second stub shaft clutch teeth 566 extend outboard from at least a portion of the second end portion 564 of the increased diameter portion 560 of the second stub shaft 552 of the drive unit assembly 500. It is within the scope of this disclosure and as a non-limiting example that the plurality of second stub shaft clutch teeth 566 may be a plurality of face clutch teeth and/or a plurality of dog clutch teeth.

Extending co-axially with and rotationally connected to the second stub shaft 552 of the drive unit assembly 500 is a second shaft 568 having a first end portion 570, a second end portion 572 and an outer surface 574. At least a portion of the second end portion 572 of the second shaft 568 is drivingly connected to at least a portion of the second wheel assembly (not shown). It is within the scope of this disclosure and as a non-limiting example that the second shaft 568 of the drive unit assembly 500 may be a second axle half shaft, a second forward axle half shaft or a second rear axle half shaft.

As illustrated in FIGS. 6 and 7 of disclosure and as a non-limiting example, at least a portion of the first end portion 570 of the second shaft 568 is rotatively connected to at least a portion of the second end portion 556 of the second stub shaft 552 of the drive unit assembly 500. It is to be understood that the rotative connection between the second shaft 568 and the second stub shaft 552 may be as a result of a male portion (not shown) being received within at least a portion of a female portion (not shown). According to an embodiment of the disclosure and as a non-limiting example, a male portion (not shown) of the first end portion 570 of the second shaft 568 may be received within at least a portion of a female portion (not shown) in the second end portion 556 of the second stub shaft 552. In accordance with an alternative embodiment of the disclosure and as a non-limiting example, a male portion (not shown) of the second end portion 556 of the second stub shaft 552 may be received within at least a portion of a female portion (not shown) in the first end portion 570 of the second shaft 568.

Disposed radially outboard from and extending co-axially with at least a portion of the second shaft 568 of the drive unit assembly 500 is the second shaft connect and disconnect assembly 504 of the drive unit assembly 500. The second shaft connect and disconnect assembly 504 allows for the selective connecting and disconnecting of the second shaft 568 with the second stub shaft 552 of the drive unit assembly 500. As a result, it is to be understood that the second shaft connect and disconnect assembly 504 of the drive unit assembly 500 may selectively connect and disconnect the second shaft 568 from the differential assembly 379 and the motor 302 of the drive unit assembly 500. By locating the second shaft connect and disconnect assembly 504 of the drive unit assembly 500 in the location illustrated in FIGS. 6 and 7 of the disclosure, it reduces the overall amount of spin loss and/or churning loss experienced by the drive unit assembly 500 thereby improving the overall life, durability and performance of the drive unit assembly 500.

As best seen in FIG. 7 of the disclosure and as a non-limiting example, the second shaft connect and disconnect assembly 504 of the drive unit assembly 500 includes a sliding collar 576 having an inner surface 578 and an outer surface 580 that is selectively engageable with at least a portion of the second stub shaft 552. The sliding collar 576 of the second shaft connect and disconnect assembly 504 extends co-axially with the second shaft 568 of the drive unit assembly 500. Circumferentially extending from at least a portion of the inner surface 578 of the sliding collar 576 is a plurality of axially extending sliding collar splines 582. The plurality of axially extending sliding collar splines 528 on the inner surface 578 of the sliding collar 576 of the second shaft connect and disconnect assembly 504 are complementary to and meshingly engaged with a plurality of axially extending second shaft splines 584 circumferentially extending from at least a portion of the outer surface 574 of the first end portion 570 of second first shaft 568.

Extending outboard from at least a portion of the sliding collar 576 of the second shaft connect and disconnect assembly 504 is a plurality of sliding collar clutch teeth 586. The plurality of sliding collar clutch teeth 586 are complementary to and selectively engageable with the plurality of second stub shaft clutch teeth 566 of the second stub shaft 552. It is within the scope of this disclosure and as a non-limiting example the plurality of sliding collar clutch teeth 586 of the sliding collar 576 of the second shaft connect and disconnect assembly 504 may be a plurality of face clutch teeth and/or a plurality of dog clutch teeth.

Disposed radially outboard from at least a portion of the sliding collar 576 of the second shaft connect and disconnect assembly 504 of the drive unit assembly 500 is a second actuation mechanism 588 and a shift shaft 590. As illustrated in FIGS. 6 and 7 of the disclosure and as a non-limiting example, at least a portion of the shift shaft 590 is rotatively and drivingly connected with at least a portion of the outer surface 580 of the sliding collar 576 of the second shaft connect and disconnect assembly 504. Drivingly connected to at least a portion of an end of the shift shaft 590, opposite the sliding collar 576, is at least a portion of the second actuation mechanism 588 of the second shaft connect and disconnect assembly 504. As a result, the second actuation mechanism 588 is drivingly connected to at least a portion of the sliding collar 576 of the second shaft connect and disconnect assembly 504. It is within the scope of this disclosure and as a non-limiting example that the second actuation mechanism 588 may be a linear actuator mechanism, a pneumatic actuator mechanism, an electro-mechanical actuator mechanism and/or an electro-magnetic actuator mechanism.

As best seen in FIG. 6 of the disclosure and as a non-limiting example, when the second shaft connect and disconnect assembly 504 of the drive unit assembly 500 is in the position illustrated in FIG. 6, the second shaft connect and disconnect assembly 504 is in a first position 592. When the second shaft connect and disconnect assembly 504 is in the first position 592 illustrated in FIG. 6, the plurality of sliding collar clutch teeth 586 of the sliding collar 576 are meshingly engaged with the plurality of second stub shaft clutch teeth 566 of the second stub shaft 552. As a result, the second shaft 568 of the drive unit assembly 500 is drivingly connected to the second stub shaft 552 which in turn drivingly connects the motor 302, the gear assembly 328 and the differential assembly 379 with the second shaft 568.

As best seen in FIG. 7 of the disclosure and as a non-limiting example, when the second shaft connect and disconnect assembly 504 of the drive unit assembly 500 is in the position illustrated in FIG. 7, the second shaft connect and disconnect assembly 504 is in a second position 594. When the second shaft connect and disconnect assembly 504 is in the second position 594 illustrated in FIG. 7, the plurality of sliding collar clutch teeth 586 of the sliding collar 576 are not meshingly engaged with the plurality of second stub shaft clutch teeth 566 of the second stub shaft 552 defining a gap 596 therebetween. As a result, the second shaft 568 of the drive unit assembly 500 is drivingly disconnected from the second stub shaft 552 which in turn drivingly disconnects the motor 302, the gear assembly 328 and the differential assembly 379 from driving engagement with the second shaft 568.

Figure 8:
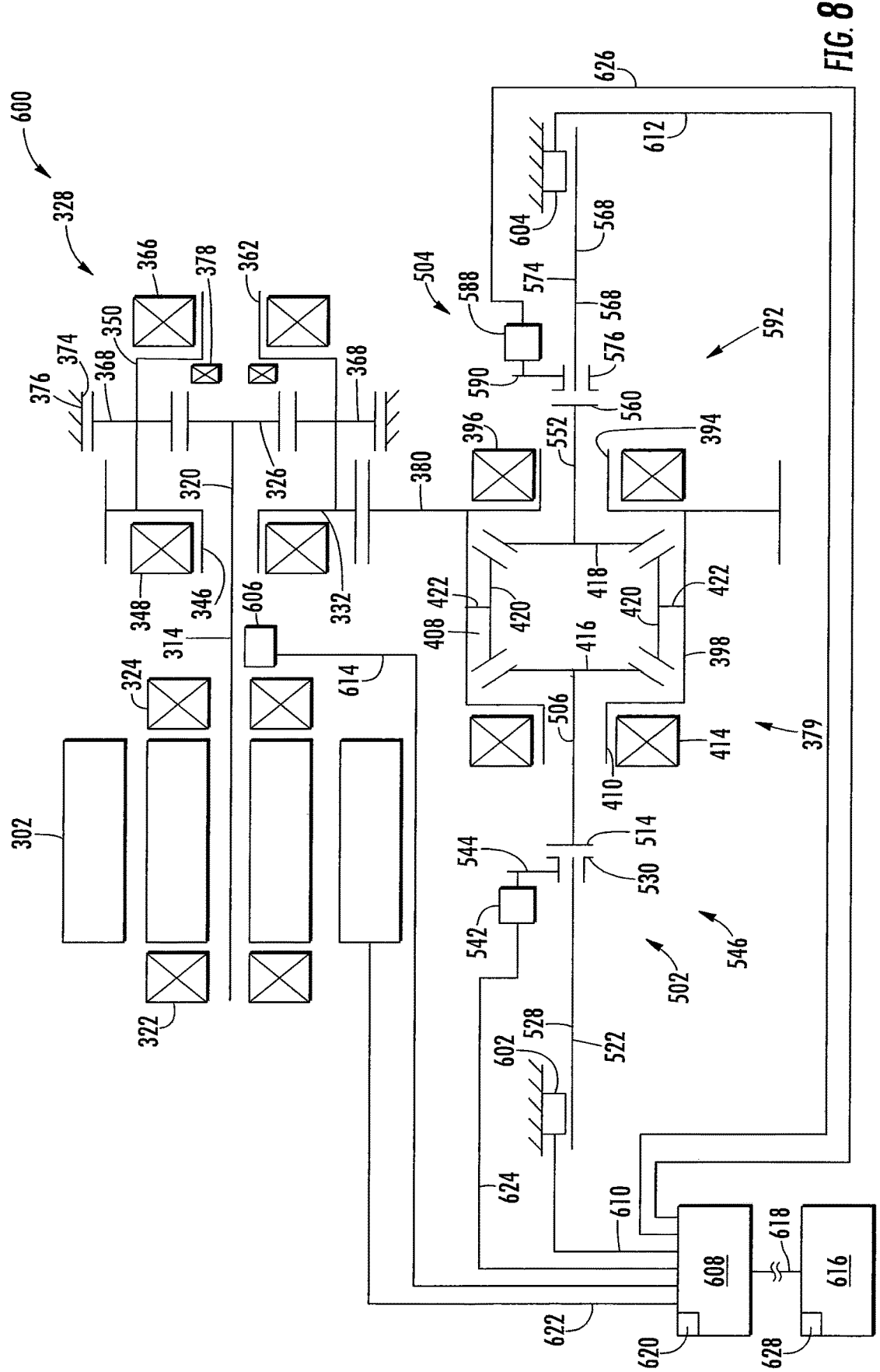
FIG. 8 is a schematic top-plan view of the drive unit assembly illustrated in FIGS. 5-7 of the disclosure according to another embodiment of the disclosure.

FIG. 8 is a schematic top-plan view of a drive unit assembly 600 having one or more sensors to an embodiment of the disclosure. The drive unit assembly 600 illustrated in FIG. 8 is the same as the drive unit assemblies 300 and 500 illustrated in FIGS. 4-7, except where specifically noted below. As illustrated in FIG. 8 of the disclosure and as a non-limiting example, the drive unit assembly 600 may include the use of a first sensor 602, a second sensor 604 and/or a third sensor 606 that aid in facilitating the synchronization, of the first shaft 522 relative first stub shaft 506 along with aiding in facilitating the synchronization of the second shaft 568 relative to the second stub shaft 552 of the drive unit assembly 600.

As illustrated in FIG. 8 of the disclosure and as a non-limiting example, at least a portion of the first sensor 602 of the drive unit assembly 600 is disposed radially outboard from at least a portion of the outer surface 528 of the first shaft 522. The first sensor 602 is operably configured to sense the rotational speed of the first shaft 522 of the drive unit assembly 600. It is within the scope of this disclosure and as a non-limiting example that the first sensor 602 of the drive unit assembly 600 may be an anti-lock braking system (ABS) sensor, a Hall effect sensor, a magnetic field sensor and/or any other sensor that is able to determine the rotational speed of a shaft.

The first sensor 602 of the drive unit assembly 600 is in communication with a control unit 608 of the drive unit assembly 600. According to the embodiment of the disclosure illustrated in FIG. 8 and as a non-limiting example, the first sensor 602 may be in communication with the control unit 608 of the drive unit assembly 600 by using one or more first sensor data-links 610. The one or more first sensor data-links 610 allow for the communication of the rotational speed data collected by the first sensor 602 to the control unit 608 of the drive unit assembly 600. As a non-limiting example, the one or more first sensor data-links 610 may be one or more fiber optic cables and/or one or more electrical cables that put the first sensor 602 of the drive unit assembly 600 in electrical communication and/or optical communication with the control unit 608 of the drive unit assembly 600.

While the embodiment of the disclosure illustrated in FIG. 8 illustrates the first sensor 602 of the drive unit assembly 600 being in electrical and/or optical communication with the control unit 608 via the one or more first sensor data-links 610, it is within the scope of this disclosure that the first sensor 602 may be in wireless communication with the control unit 608 of the drive unit assembly 600. In accordance with an embodiment of the disclosure and as a non-limiting example, the wireless communication between the control unit 608 and the first sensor 602 may be a Bluetooth connection, a Wi-fi connection, a cellular connection and/or a radio wave connection. As a result, it is within the scope of this disclosure that the first sensor 602 may be operably configured to transmit the rotational speed data collected wirelessly to the control unit 608 which in turn is operably configured to receive the wirelessly transmitted rotational data collected by the first sensor 602.

As illustrated in FIG. 8 of the disclosure and as a non-limiting example, at least a portion of the second sensor 604 of the drive unit assembly 600 is disposed radially outboard from at least a portion of the outer surface 574 of the second shaft 568. The second sensor 604 is operably configured to sense the rotational speed of the second shaft 568 of the drive unit assembly 600. It is within the scope of this disclosure and as a non-limiting example that the second sensor 604 of the drive unit assembly 600 may be an ABS sensor, a Hall effect sensor, a magnetic field sensor and/or any other sensor that is able to determine the rotational speed of a shaft.

The second sensor 604 of the drive unit assembly 600 is in communication with the control unit 608 of the drive unit assembly 600. According to the embodiment of the disclosure illustrated in FIG. 8 and as a non-limiting example, the second sensor 604 may be in communication with the control unit 608 of the drive unit assembly 600 by using one or more second sensor data-links 612. The one or more second sensor data-links 612 allow for the communication of the rotational speed data collected by the second sensor 604 to the control unit 608 of the drive unit assembly 600. As a non-limiting example, the one or more second sensor data-links 612 may be one or more fiber optic cables and/or one or more electrical cables that put the second sensor 604 of the drive unit assembly 600 in electrical communication and/or optical communication with the control unit 608 of the drive unit assembly 600.

While the embodiment of the disclosure illustrated in FIG. 8 illustrates the second sensor 604 of the drive unit assembly 600 being in electrical and/or optical communication with the control unit 608 via the one or more second sensor data-links 612, it is within the scope of this disclosure that the second sensor 604 may be in wireless communication with the control unit 608 of the drive unit assembly 600. In accordance with an embodiment of the disclosure and as a non-limiting example, the wireless communication between the control unit 608 and the second sensor 604 may be a Bluetooth connection, a Wi-fi connection, a cellular connection and/or a radio wave connection. As a result, it is within the scope of this disclosure that the second sensor 604 may be operably configured to transmit the rotational speed data collected wirelessly to the control unit 608 which in turn is operably configured to receive the wirelessly transmitted rotational data collected by the second sensor 604.

Disposed radially outboard from at least a portion of the outer surface 320 of the motor spindle or motor output shaft 314 is the third sensor 606 of the drive unit assembly 600. The third sensor 606 is operably configured to sense the rotational speed of the motor spindle or motor output shaft 314 of the drive unit assembly 600. It is within the scope of this disclosure and as a non-limiting example that the third sensor 606 of the drive unit assembly 600 may be an ABS sensor, a Hall effect sensor, a magnetic field sensor and/or any other sensor that is able to determine the rotational speed of a shaft.

The first third 606 of the drive unit assembly 600 is in communication with a control unit 608 of the drive unit assembly 600. According to the embodiment of the disclosure illustrated in FIG. 8 and as a non-limiting example, the third sensor 606 may be in communication with the control unit 608 of the drive unit assembly 600 by using one or more third sensor data-links 614. The one or more third sensor data-links 614 allow for the communication of the rotational speed data collected by the third sensor 606 to the control unit 608 of the drive unit assembly 600. As a non-limiting example, the one or more third sensor data-links 614 may be one or more fiber optic cables and/or one or more electrical cables that put the third sensor 606 of the drive unit assembly 600 in electrical communication and/or optical communication with the control unit 608 of the drive unit assembly 600.

While the embodiment of the disclosure illustrated in FIG. 8 illustrates the third sensor 606 of the drive unit assembly 600 being in electrical and/or optical communication with the control unit 608 via the one or more third sensor data-links 614, it is within the scope of this disclosure that the third sensor 606 may be in wireless communication with the control unit 608 of the drive unit assembly 600. In accordance with an embodiment of the disclosure and as a non-limiting example, the wireless communication between the control unit 608 and the third sensor 606 may be a Bluetooth connection, a Wi-fi connection, a cellular connection and/or a radio wave connection. As a result, it is within the scope of this disclosure that the third sensor 606 may be operably configured to transmit the rotational speed data collected wirelessly to the control unit 608 which in turn is operably configured to receive wirelessly transmitted rotational data collected by the third sensor 606.

As illustrated in FIG. 8 of the disclosure and as a non-limiting example, the motor 302 may be in communication with the control unit 608 via one or more motor data-links 622. The one or more motor data-links 622 allow the control unit 608 to instruct the motor 302 to either increase or decrease the rotational speed of the motor spindle or motor output shaft 314. As a non-limiting example, the one or more motor data-links 622 may be one or more fiber optic cables and/or one or more electrical cables that put the motor 302 of the drive unit assembly 600 in electrical communication and/or optical communication with the control unit 608 of the drive unit assembly 600. While the embodiment of the disclosure illustrated in FIG. 8 illustrates the motor 302 of the drive unit assembly 600 being in electrical and/or optical communication with the control unit 608 via the one or more motor data-links 622, it is within the scope of this disclosure that the motor 302 may be in wireless communication with the control unit 608 of the drive unit assembly 600. In accordance with an embodiment of the disclosure and as a non-limiting example, the wireless communication between the control unit 608 and motor 302 may be a Bluetooth connection, a Wi-fi connection, a cellular connection and/or a radio wave connection. As a result, it is within the scope of this disclosure that the motor 302 may be operably configured to receive instruction(s) wirelessly transmitted by the control unit 608 to either increase or decrease the rotational speed of the motor spindle or motor output shaft 314.

Additionally, as illustrated in FIG. 8 of the disclosure and as a non-limiting example, the first actuation mechanism 542 of the first shaft connect and disconnect assembly 502 may be in communication with the control unit 608 via one or more first actuation mechanism data-links 624. The one or more first actuation mechanism data-links 624 allow the control unit 608 to instruct the first actuation mechanism 542 to selectively transition the sliding collar 530 of the first shaft connect and disconnect assembly 502 between the first engaged position 546 and the second disengaged position 548 illustrated in FIGS. 6 and 7 of the disclosure. As a non-limiting example, the one or more first actuation mechanism data-links 624 may be one or more fiber optic cables and/or one or more electrical cables that put the first actuation mechanism 542 of the drive unit assembly 600 in electrical communication and/or optical communication with the control unit 608 of the drive unit assembly 600. While the embodiment of the disclosure illustrated in FIG. 8 illustrates the first actuation mechanism 542 of the drive unit assembly 600 being in electrical and/or optical communication with the control unit 608 via the one or more first actuation mechanism data-links 624, it is within the scope of this disclosure that the first actuation mechanism 542 may be in wireless communication with the control unit 608 of the drive unit assembly 600. In accordance with an embodiment of the disclosure and as a non-limiting example, the wireless communication between the control unit 608 and first actuation mechanism 542 may be a Bluetooth connection, a Wi-fi connection, a cellular connection and/or a radio wave connection. As a result, it is within the scope of this disclosure that the first actuation mechanism 542 may be operably configured to receive instruction(s) wirelessly transmitted by the control unit 608 to either engage or disengage the sliding collar 530 of the first shaft connect and disconnect assembly 502 with the first stub shaft 506.

Furthermore, as illustrated in FIG. 8 of the disclosure and as a non-limiting example, the second actuation mechanism 588 of the second shaft connect and disconnect assembly 504 may be in communication with the control unit 608 via one or more second actuation mechanism data-links 626. The one or more second actuation mechanism data-links 626 allow the control unit 608 to instruct the second actuation mechanism 588 to selectively transition the sliding collar 576 of the second shaft connect and disconnect assembly 504 between the first engaged position 592 and the second disengaged position 594 illustrated in FIGS. 6 and 7 of the disclosure. As a non-limiting example, the one or more second actuation mechanism data-links 626 may be one or more fiber optic cables and/or one or more electrical cables that put the second actuation mechanism 588 of the drive unit assembly 600 in electrical communication and/or optical communication with the control unit 608 of the drive unit assembly 600. While the embodiment of the disclosure illustrated in FIG. 8 illustrates the second actuation mechanism 588 of the drive unit assembly 600 being in electrical and/or optical communication with the control unit 608 via the one or more second actuation mechanism data-links 626, it is within the scope of this disclosure that the second actuation mechanism 588 may be in wireless communication with the control unit 608 of the drive unit assembly 600. In accordance with an embodiment of the disclosure and as a non-limiting example, the wireless communication between the control unit 608 and second actuation mechanism 588 may be a Bluetooth connection, a Wi-fi connection, a cellular connection and/or a radio wave connection. As a result, it is within the scope of this disclosure that the second actuation mechanism 588 may be operably configured to receive instruction(s) wirelessly transmitted by the control unit 608 to either engage or disengage the sliding collar 576 of the second shaft connect and disconnect assembly 504 with the second stub shaft 552.

In order to facilitate the synchronization of the first shaft 522 relative to the first stub shaft 506 and/or the synchronization of the second shaft 568 relative to the second stub shaft 552, the control unit 608 of the drive unit assembly 600 may include one or more control unit data processors 620. The one or more data processors of the control unit 608 are operably configured to collect and analyze the rotational data collected from the first, second and/or third sensors 602, 604 and/or 606. When in operation, the one or more control unit data processors 620 of the control unit 608 will compare the rotational speed of the motor spindle or motor output shaft 314 to the rotational speed of the first shaft 522 and/or to the rotational speed of the second shaft 568 of the drive unit assembly 600. Based on the rotational speed data analyzed, the control unit 608 will instruct the motor 302 to either increase the rotational speed of the motor spindle or motor output shaft 314 or the control unit will instruct the motor 302 to decrease the rotational speed of the motor spindle or motor output shaft 314.

If, based on the rotational speed of the motor spindle or a motor output shaft 314, the rotational speed of the first stub shaft 506 is less than the rotational speed of the first shaft 522, then the control unit 608 will instruct the motor 302 to increase the rotational speed of the motor spindle or motor output shaft 314. Once the rotational speed of the first shaft 522 is substantially equal to the rotational speed of the first stub shaft 506, the control unit 608 will instruct the first actuation mechanism 542 to transition the sliding collar 530 of the first shaft connect and disconnect assembly 502 between the first engaged position 546 and the second disengaged position 548. By controlling the rotational speed of the motor spindle or motor output shaft 314 to synchronize the rotational speed of the first shaft 522 relative to the first stub shaft 506, it reduces the overall amount of NVH experience by the first shaft connect and disconnect assembly 502 as the sliding collar 530 is transitioned between the first and second positions 546 and 548. The amount of NVH experienced by the first shaft connect and disconnect assembly 502 may be due to a mashing or a misalignment of the plurality of first stub shaft clutch teeth 520 of the first stub shaft 506 with the plurality of sliding collar clutch teeth 540 of the sliding collar 530 during the engagement or disengagement of the sliding collar 530 with the first stub shaft 506. This aids in improving the overall life and durability of the first shaft connect and disconnect assembly 502 and the drive unit assembly 600 by allowing for a smooth transition of the sliding collar 530 between the first and second positions 546 and 548.

If, based on the rotational speed of the motor spindle or motor output shaft 314, the rotational speed of the second stub shaft 552 is greater than the rotational speed of the second shaft 568, then the control unit 608 will instruct the motor 302 to decrease the rotational speed of the motor spindle or motor output shaft 314. Once the rotational speed of the second shaft 568 is substantially equal to the rotational speed of the second stub shaft 552, the control unit 608 will instruct the second actuation mechanism 588 to transition the sliding collar 576 of the second shaft connect and disconnect assembly 504 between the first engaged position 592 and the second disengaged position 594. By controlling the rotational speed of the motor spindle or motor output shaft 314 to synchronize the rotational speed of the second shaft 568 relative to the second stub shaft 552, it reduces the overall amount of NVH experience by the second shaft connect and disconnect assembly 504 as the sliding collar 576 is transitioned between the first and second positions 592 and 594. The amount of NVH experienced by the second shaft connect and disconnect assembly 504 may be due to a mashing or a misalignment of the plurality of second stub shaft clutch teeth 566 of the second stub shaft 552 with the plurality of sliding collar clutch teeth 586 of the sliding collar 576 during the engagement or disengagement of the sliding collar 576 with the second stub shaft 552. This aids in improving the overall life and durability of the second shaft connect and disconnect assembly 504 and the drive unit assembly 600 by allowing for a smooth transition of the sliding collar 576 between the first and second positions 592 and 594.

As illustrated in FIG. 8 of the disclosure and as a non-limiting example, the control unit 608 of the drive unit assembly 600 may be in communication with a vehicle bus 616 of the vehicle (not shown). It is within the scope of this disclosure and as a non-limiting example that the vehicle bus 616 of the vehicle (not shown) may be a Controller Area Network (CAN) Bus. The control unit 608 of the drive unit assembly 600 may be in communication with the vehicle bus 616 of the vehicle (not shown) by using one or more control unit data-links 618. As a non-limiting example, the one or more control unit data-links 618 may be one or more fiber optic cables and/or one or more electrical cables that put the control unit 608 of the drive unit assembly 600 in electrical communication and/or optical communication with the vehicle bus 616 of the vehicle (not shown).

While the embodiment of the disclosure illustrated in FIG. 8 illustrates the control unit 608 of the drive unit assembly 600 being in electrical communication with the vehicle bus 616 via one or more control unit data-links 618, it is within the scope of this disclosure that the control unit 608 may be in wireless communication with the vehicle bus 616 of the vehicle (not shown). In accordance with an embodiment of the disclosure and as a non-limiting example, the wireless communication between the control unit 608 and the vehicle bus 616 may be a Bluetooth connection, a Wi-fi connection, a cellular connection and/or a radio wave connection. As a result, it is within the scope of this disclosure that the control unit 608 may be operably configured to transmit the rotational speed data collected from the first, second and/or third sensors 602, 604 and/or 606 wirelessly to the vehicle bus 616 which in turn is operably configured to receive the wirelessly transmitted rotational data collected by the control unit 608.

According to an embodiment of the disclosure where the control unit 608 of the drive unit 600 is in communication with a vehicle bus 616 and as a non-limiting example, the vehicle bus 616 may further include the use of one or more vehicle bus data processors 628. The one or more vehicle bus data processors 628 are operably configured to collect and analyze the rotational data collected from the first, second and/or third sensors 602, 604 and/or 606. In accordance with this embodiment of the disclosure, the control unit 608 will not need the one or more control unit data processors 620 illustrated in FIG. 8. When in operation, the one or more vehicle bus data processors 628 of the vehicle bus 616 will compare the rotational speed of the motor spindle or motor output shaft 314 to the rotational speed of the first shaft 522 and/or to the rotational speed of the second shaft 568 of the drive unit assembly 600. Based on the rotational speed data analyzed, the vehicle bus 616 will instruct the control unit 608 to instruct the motor 302 to either increase or decrease the rotational speed of the motor spindle or motor output shaft 314.

If, based on the rotational speed of the motor spindle or motor output shaft 314, the rotational speed of the first stub shaft 506 is less than the rotational speed of the first shaft 522, then the vehicle bus 616 will instruct the control unit 608 to instruct the motor 302 to increase the rotational speed of the motor spindle or motor output shaft 314. Once the rotational speed of the first shaft 522 is substantially equal to the rotational speed of the first stub shaft 506, the vehicle bus 616 will instruct the control unit 608 to instruct the first actuation mechanism 542 to transition the sliding collar 530 of the first shaft connect and disconnect assembly 502 between the first engaged position 546 and the second disengaged position 548. As previously discussed, by controlling the rotational speed of the motor spindle or motor output shaft 314 to synchronize the rotational speed of the first shaft 522 relative to the first stub shaft 506, it reduces the overall amount of NVH experience by the first shaft connect and disconnect assembly 502 as the sliding collar 530 is transitioned between the first and second positions 546 and 548. The amount of NVH experienced by the first shaft connect and disconnect assembly 502 may be due to a mashing or a misalignment of the plurality of first stub shaft clutch teeth 520 of the first stub shaft 506 with the plurality of sliding collar clutch teeth 540 of the sliding collar 530 during the engagement or disengagement of the sliding collar 530 with the first stub shaft 506. This aids in improving the overall life and durability of the first shaft connect and disconnect assembly 502 and the drive unit assembly 600 by allowing for a smooth transition of the sliding collar 530 between the first and second positions 546 and 548.

If, based on the rotational speed of the motor spindle or motor output shaft 314, the rotational speed of the second stub shaft 552 is greater than the rotational speed of the second shaft 568, then the vehicle bus 616 will instruct the control unit 608 to instruct the motor 302 to decrease the rotational speed of the motor spindle or motor output shaft 314. Once the rotational speed of the second shaft 568 is substantially equal to the rotational speed of the second stub shaft 552, the vehicle bus 616 will instruct the control unit 608 to instruct the second actuation mechanism 588 to transition the sliding collar 576 of the second shaft connect and disconnect assembly 504 between the first engaged position 592 and the second disengaged position 594. As previously discussed, by controlling the rotational speed of the motor spindle or motor output shaft 314 to synchronize the rotational speed of the second shaft 568 relative to the second stub shaft 552, it reduces the overall amount of NVH experience by the second shaft connect and disconnect assembly 504 as the sliding collar 576 is transitioned between the first and second positions 592 and 594. The amount of NVH experienced by the second shaft connect and disconnect assembly 504 may be due to a mashing or a misalignment of the plurality of second stub shaft clutch teeth 566 of the second stub shaft 552 with the plurality of sliding collar clutch teeth 586 of the sliding collar 576 during the engagement or disengagement of the sliding collar 576 with the second stub shaft 552. This aids in improving the overall life and durability of the second shaft connect and disconnect assembly 504 and the drive unit assembly 600 by allowing for a smooth transition of the sliding collar 576 between the first and second positions 592 and 594.

It is within the scope of this disclosure and as a non-limiting example that the control unit 608 and/or the vehicle bus 616 may continuously monitor and analyze the rotational speed of the first shaft 522, the second shaft 568 and/or the motor spindle or motor output shaft 314. Additionally, it is within the scope of this disclosure and as a non-limiting example that the control unit 608 and/or the vehicle bus 616 may monitor and analyze the rotational speed of the first shaft 522, the second shaft 568 and/or the motor spindle or motor output shaft 314 at pre-determined intervals. As a non-limiting example, the pre-determined intervals may be upon receipt of an instruction to transition the sliding collars 530 and/or 576 between the first engaged positions 546 and 548 and the second disengaged positions 592 and 594. Furthermore, it is within the scope of this disclosure and as a non-limiting example that the control unit 608 of the drive unit assembly 600 may monitor and analyze the rotational speed of the first shaft 522, the second shaft 568 and/or the motor spindle or motor output shaft 314 upon receiving an instruction from the vehicle bus 616 of the vehicle (not shown). As a non-limiting example, the instruction from the vehicle but 616 may be to begin monitoring and analyzing the rotational speed of the first shaft 522, the second shaft 568 and/or the motor spindle or motor output shaft 314 and/or an instruction from the vehicle bus 616 to transition the sliding collars 530 and/or 576 between the first engaged positions 546 and 548 and the second disengaged positions 592 and 594.

Figure 9:
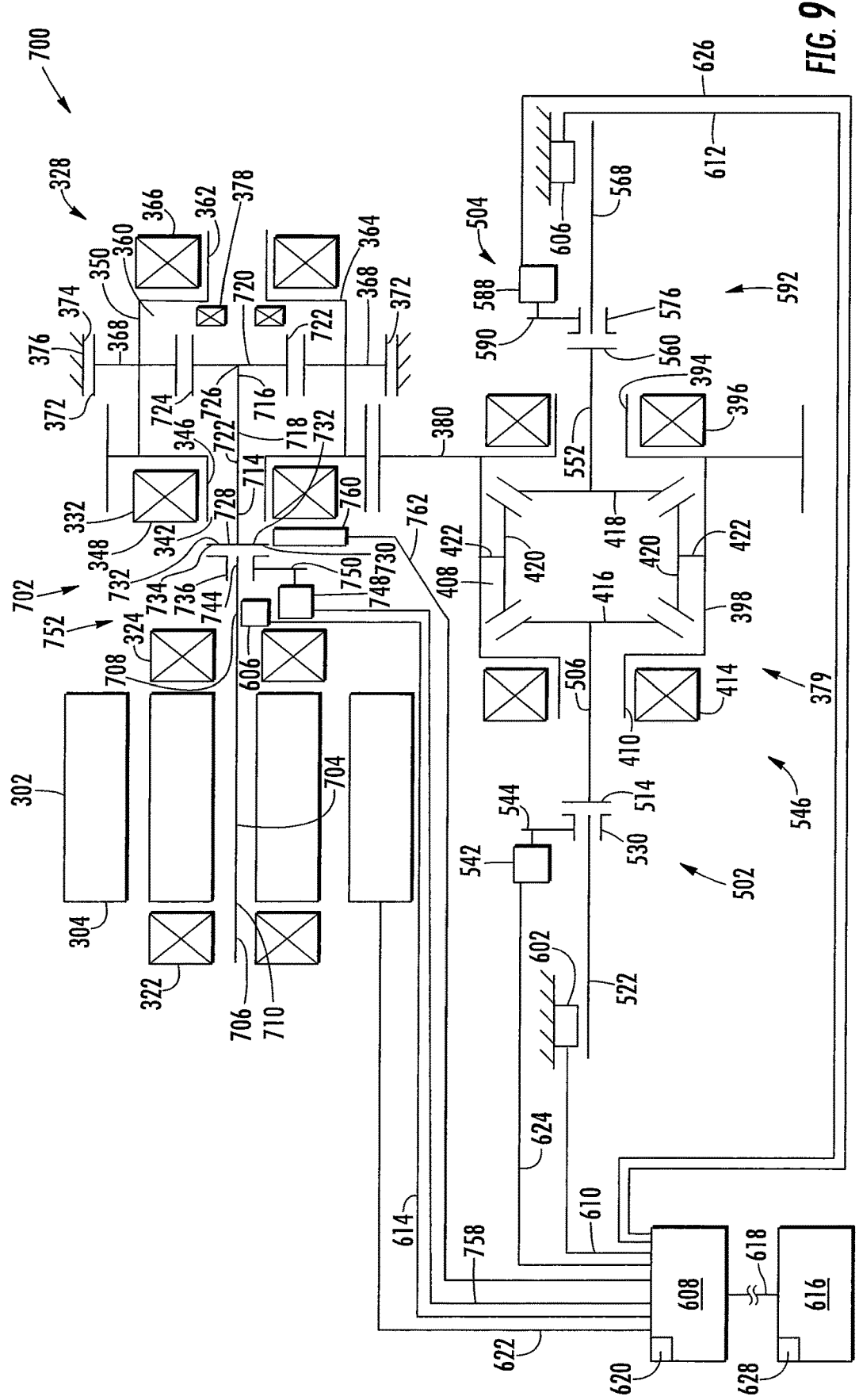
FIG. 9 is a schematic top-plan view of the drive unit illustrated in FIGS. 5-8 according to an yet another embodiment of the disclosure where the drive unit assembly includes a motor connect and disconnect assembly in a first position.
Figure 10:
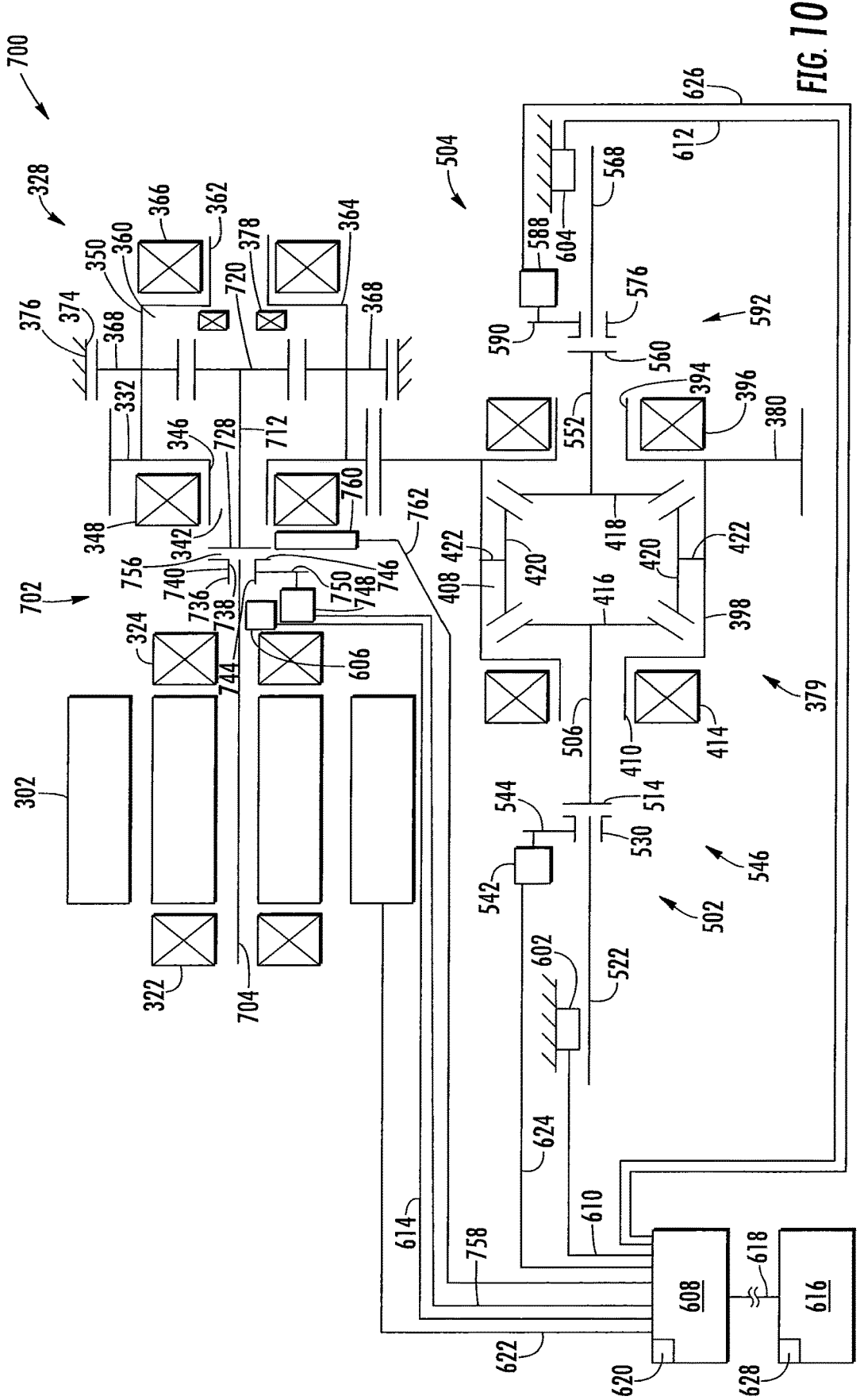
FIG. 10 is a schematic top-plan view of the drive unit assembly illustrated in FIG. 9 where the motor connect and disconnect assembly is in a second position.

FIGS. 9 and 10 provide a schematic top-plan view of a drive unit assembly 700 having a motor connect and disconnect assembly 702 according to an embodiment of the disclosure. The drive unit assembly 700 illustrated in FIGS. 9 and 10 is the same as the drive unit assemblies 300, 500 and 600 illustrated in FIGS. 5-8, except where specifically noted below. It is within the scope of this disclosure and as a non-limiting example that the motor connect and disconnect assembly 702 may be any assembly that is able to drivingly connect a motor spindle or a motor output shaft 704 to a gear assembly input shaft 712.

As illustrated in FIGS. 9 and 10 of the disclosure and as a non-limiting example, the motor spindle or motor output shaft 704 has a first end portion 706, a second end portion 708 and an outer surface 710 extends co-axially with the motor 302 of the drive unit assembly 700. At least a portion of the motor 302 of the drive unit assembly 700 is drivingly connected to at least a portion of the outer surface 710 of the motor spindle or motor output shaft 704.

In accordance with the embodiment of the disclosure illustrated in FIG. 9 and as a non-limiting example, at least a portion of the first end portion 706 of the motor spindle or motor output shaft 704 is rotationally supported by at least a portion of the first motor spindle or motor output shaft bearing 322. As a result, the at least a portion of the first motor spindle or motor output shaft bearing 322 of the drive unit assembly 700 extends co-axially with and is in direct contact with at least a portion of the motor spindle or motor output shaft 704.

Additionally, as illustrated in FIG. 9 of the disclosure and as a non-limiting example, at least a portion of the motor spindle or motor output shaft 704 is rotationally supported by the second motor spindle or motor output shaft bearing 324 of the drive unit assembly 700. As a result, at least a portion of the second motor spindle or motor output shaft bearing 324 extends co-axially with and is in direct contact with at least a portion of the motor spindle or motor output shaft 704 of the drive unit assembly 700.

Extending co-axially with and rotatively connected to the motor spindle or motor output shaft 704 of the drive unit assembly 700 is the gear assembly input shaft 712 having a first end portion 714, a second end portion 716 and an outer surface 718. As illustrated in FIGS. 9 and 10 of the disclosure and as a non-limiting example, at least a portion of the gear assembly input shaft extends from outside the gear assembly housing 350, through the hollow portion 342 of the pinion gear 332 and into the hollow portion 360 of the gear assembly housing 350.

Drivingly connected to at least a portion of the second end portion 716 of the gear assembly input shaft 712 is a sun gear 720 of the gear assembly 328. The sun gear 720 of the gear assembly 328 extends co-axially with the gear assembly input shaft 712. Circumferentially extending from at least a portion of an outer surface 722 of the sun gear 720 is a plurality of sun gear teeth 724. The plurality of sun gear teeth 724 on the outer surface 722 of the sun gear 720 are complementary to and meshingly engaged with the plurality of planetary gear teeth 372 on the outer surface 370 of the one or more planetary gears 368. It is within the scope of this disclosure and as a non-limiting example, the plurality of sun gear teeth 724 extending from the outer surface 722 of the sun gear 720 may be a plurality of hypoid gear teeth, spiral bevel gear teeth, helical gear teeth, spur gear teeth, double hypoid gear teeth, double spiral bevel gear teeth and/or double helical gear teeth.

According to an embodiment of the disclosure and as a non-limiting example, the sun gear 720 of the gear assembly 328 may be a separate component from the gear assembly input shaft 712. In accordance with this embodiment of the scope of this disclosure and as a non-limiting example, at least a portion of an inner surface 726 of the sun gear 720 may be integrally connected to at least a portion of the second end portion 716 of the gear assembly input shaft 712 of the drive unit assembly 700. It is within the scope of this disclosure and as a non-limiting example that at least a portion of the inner surface 726 of the sun gear 720 of the gear assembly 328 may be integrally connected to at least a portion of the second end portion 716 of the gear assembly input shaft 712 by using one or more welds, one or more mechanical fasteners, one or more adhesives, a spline connection and/or a threaded connection.

In accordance with an alternative embodiment of the disclosure and as a non-limiting example, the sun gear 720 of the gear assembly 328 may be integrally formed as part of the second end portion 726 of the gear assembly input shaft 712 of the drive unit assembly 700. According to this embodiment of the disclosure and as a non-limiting example, the sun gear 720 may be cast as part of the gear assembly input shaft 712 and/or machined into at least a portion of the second end portion 716 of the gear assembly input shaft 712.

According to the embodiment of the disclosure illustrated in FIGS. 9 and 10 of the disclosure and as a non-limiting example, at least a portion of the one or more sun gear bearings 378 are interposed between the sun gear 720 and the radially extending wall portion 364 of the second end portion 354 of the gear assembly housing 350. The one or more sun gear bearings 378 of the gear assembly 328 provides rotational support and/or axial load support for at least a portion of the sun gear 720 when in operation. As a result, the one or more sun gear bearings 378 allow for the sun gear 720 of the gear assembly 328 to be a floating sun gear. By providing the gear assembly 328 of the drive unit assembly 700 with a floating sun gear 720, it aids in improving the overall load sharing between the one or more planetary gears 368, it reduces the overall amount of NVH experienced by the gear assembly 328 and it improves the overall life and durability of the drive unit assembly 700.

As best seen in FIG. 9 of the disclosure and as a non-limiting example, at least a portion of the first end portion 714 of the gear assembly input shaft 712 is rotatively connected to at least a portion of the second end portion 708 of the motor spindle or motor output shaft 704 of the drive unit assembly 700. It is to be understood that the rotative connection between the motor spindle or motor output shaft 704 and the gear assembly input shaft 712 may be as a result of a male portion (not shown) being received within at least a portion of a female portion (not shown). According to an embodiment of the disclosure and as a non-limiting example, a male portion (not shown) of the second end portion 708 of the motor spindle or motor output shaft 704 may be received within at least a portion of a female portion (not shown) in the first end portion 714 of gear assembly input shaft 712. In accordance with an alternative embodiment of the disclosure and as a non-limiting example, a male portion (not shown) of the first end portion 714 of gear assembly input shaft 712 may be received within at least a portion of a female portion (not shown) in the second end portion 708 of the motor spindle or motor output shaft 704.

Circumferentially extending from at least a portion of the outer surface 718 of the first end portion 714 of the gear assembly input shaft 712 is an increased diameter portion 728 having a first end portion 730 and a second end portion 732. As best seen in FIG. 9 of the disclosure and as a non-limiting example, a plurality of gear assembly input stub shaft clutch teeth 734 extend outboard from at least a portion of the first end portion 730 of the increased diameter portion 728 of the gear assembly input shaft 712 of the drive unit assembly 700. It is within the scope of this disclosure and as a non-limiting example that the plurality of gear assembly input stub shaft clutch teeth 734 may be a plurality of face clutch teeth and/or a plurality of dog clutch teeth.

As best seen in FIG. 10 of the disclosure and as a non-limiting example, the motor connect and disconnect assembly 702 of the drive unit assembly 700 includes a sliding collar 736 having an inner surface 738 and an outer surface 740 that is selectively engageable with at least a portion of the gear assembly input shaft 712. The sliding collar 736 of the motor connect and disconnect assembly 702 extends co-axially with the motor spindle or motor output shaft 704 of the drive unit assembly 700. Circumferentially extending from at least a portion of the inner surface 738 of the sliding collar 736 is a plurality of axially extending sliding collar splines 742. The plurality of axially extending sliding collar splines 742 on the inner surface 738 of the sliding collar 736 of the motor connect and disconnect assembly 702 are complementary to and meshingly engaged with a plurality of axially extending or spindle or a motor output shaft splines 744 circumferentially extending from at least a portion of the outer surface 710 of the second end portion 708 of the motor spindle or motor output shaft 704.

Extending outboard from at least a portion of the sliding collar 736 of the motor connect and disconnect assembly 702 is a plurality of sliding collar clutch teeth 746. The plurality of sliding collar clutch teeth 746 are complementary to and selectively engageable with the plurality of gear assembly input stub shaft clutch teeth 734 of the gear assembly input shaft 712. It is within the scope of this disclosure and as a non-limiting example the plurality of sliding collar clutch teeth 746 of the sliding collar 736 of the motor connect and disconnect assembly 702 may be a plurality of face clutch teeth and/or a plurality of dog clutch teeth.

Disposed radially outboard from at least a portion of the sliding collar 736 of the motor connect and disconnect assembly 702 of the drive unit assembly 700 is an actuation mechanism 748 and a shift shaft 750. As illustrated in FIGS. 9 and 10 of the disclosure and as a non-limiting example, at least a portion of the shift shaft 750 is rotatively and drivingly connected with at least a portion of the outer surface 740 of the sliding collar 736 of the motor connect and disconnect assembly 702. Drivingly connected to at least a portion of an end of the shift shaft 750, opposite the sliding collar 736, is at least a portion of the actuation mechanism 748 of the motor connect and disconnect assembly 702. As a result, the actuation mechanism 748 is drivingly connected to at least a portion of the sliding collar 736 of the motor connect and disconnect assembly 702. It is within the scope of this disclosure and as a non-limiting example that the actuation mechanism 748 may be a linear actuator mechanism, a pneumatic actuator mechanism, an electro-mechanical actuator mechanism and/or an electro-magnetic actuator mechanism.

As best seen in FIG. 9 of the disclosure and as a non-limiting example, when the motor connect and disconnect assembly 702 of the drive unit assembly 700 is in the position illustrated in FIG. 9, the motor connect and disconnect assembly 702 is in a first position 752. When the motor connect and disconnect assembly 702 is in the first position 752 illustrated in FIG. 9, the plurality of sliding collar clutch teeth 746 of the sliding collar 736 are meshingly engaged with the plurality of gear assembly input stub shaft clutch teeth 734 of the gear assembly input shaft 712. As a result, the gear assembly input shaft 712 of the drive unit assembly 700 is drivingly connected to the motor spindle or motor output shaft 704 which in turn drivingly connects the motor 302 and the gear assembly 328 with the differential assembly 379.

As best seen in FIG. 10 of the disclosure and as a non-limiting example, when the motor connect and disconnect assembly 702 of the drive unit assembly 700 is in the position illustrated in FIG. 10, the motor connect and disconnect assembly 702 is in a second position 754. When the motor connect and disconnect assembly 702 is in the second position 754 illustrated in FIG. 10, the plurality of sliding collar clutch teeth 746 of the sliding collar 736 are not meshingly engaged with the plurality of gear assembly input stub shaft clutch teeth 734 of the gear assembly input shaft 712 defining a gap 756 therebetween. As a result, the gear assembly input shaft 712 of the drive unit assembly 700 is drivingly disconnected from the motor spindle or motor output shaft 704 which drivingly disconnects the motor 302 from driving engagement with the gear assembly 328 and the differential assembly 379.

In light of the above-disclosure, it is therefore within the scope of this disclosure that the motor 302 of the drive unit assembly 700 may be a bolt-on type motor. As a result, it is within the scope of this disclosure and as a non-limiting example that at least a portion of the motor 302 of the drive unit assembly 700 may attached to at least a portion of a drive unit housing (not shown), a forward axle housing (not shown) and/or a rear axle housing (not shown). In accordance with an embodiment of the disclosure and as a non-limiting example, the electric motor 302 of the drive unit assembly 700 may be attached to the drive unit housing (not shown), the forward axle housing (not shown) and/or the rear axle housing (not shown) by using one or more welds, mechanical fasteners and/or any other method of securing a motor to a housing. By making the motor 302 a bolt-on type motor, it allows the motor 302 to be easily replaced and/or repaired. Additionally, by making the motor 302 a bolt-on type motor, it allows original equipment manufacturers (OEMs) to specify the type of motor, the motor design and/or the supplier of the motor that can be used in connection with the drive unit assembly 700. This makes the drive unit assembly 700 more customizable by allowing the drive unit assembly 700 to be optimized and tailored to fit any vehicle and/or any vehicle application.

In order to facilitate synchronization of the motor spindle or motor output shaft 704 relative to the gear assembly input shaft 712, the one or more data processors 620 of the control unit 608 are operably configured to collect and analyze the rotational data collected from the first, second and/or third sensors 602, 604 and/or 606. When in operation, the one or more control unit data processors 620 of the control unit 608 will compare the rotational speed of the motor spindle or motor output shaft 704 to the rotational speed of the first shaft 522 and/or to the rotational speed of the second shaft 568 of the drive unit assembly 600. Based on the rotational speed data analyzed, the control unit 608 will instruct the motor 302 to either increase or decrease the rotational speed of the motor spindle or motor output shaft 314.

As illustrated in FIGS. 9 and 10 of the disclosure and as a non-limiting example, the actuation mechanism 748 of the motor connect and disconnect assembly 702 may be in communication with the control unit 608 via one or more second actuation mechanism data-links 758. The one or more second actuation mechanism data-links 758 allow the control unit 608 to instruct the third actuation mechanism 748 to selectively transition the sliding collar 736 of the motor connect and disconnect assembly 702 between the first engaged position 752 and the second disengaged position 745 illustrated in FIGS. 9 and 10 of the disclosure. As a non-limiting example, the one or more second actuation mechanism data-links 758 may be one or more fiber optic cables and/or one or more electrical cables that put the third actuation mechanism 748 of the drive unit assembly 700 in electrical communication and/or optical communication with the control unit 608 of the drive unit assembly 700.

While the embodiment of the disclosure illustrated in FIGS. 9 and 10 illustrates the third actuation mechanism 748 of the drive unit assembly 700 being in electrical and/or optical communication with the control unit 608 via the one or more second actuation mechanism data-links 758, it is within the scope of this disclosure that the third actuation mechanism 748 may be in wireless communication with the control unit 608 of the drive unit assembly 700. In accordance with an embodiment of the disclosure and as a non-limiting example, the wireless communication between the control unit 608 and third actuation mechanism 748 may be a Bluetooth connection, a Wi-fi connection, a cellular connection and/or a radio wave connection. As a result, it is within the scope of this disclosure that the third actuation mechanism 748 may be operably configured to receive instruction(s) wirelessly transmitted by the control unit 608 to either engage or disengage the sliding collar 736 of the motor connect and disconnect assembly 702 with the gear assembly input shaft 712.

If, based on the rotational speed of the motor spindle or motor output shaft 704 and the first shaft 522 and/or the second shaft 568, the rotational speed of the gear assembly input shaft 712 is less than the rotational speed of the gear assembly input shaft 712, then the control unit 608 will instruct the motor 302 to increase the rotational speed of the motor spindle or motor output shaft 314. Once the rotational speed of the motor spindle or motor output shaft 704 is substantially equal to the rotational speed of the gear assembly input shaft 712, the control unit 608 will instruct the third actuation mechanism 748 to transition the sliding collar 736 of the motor connect and disconnect assembly 702 between the first engaged position 752 and the second disengaged position 754. By controlling the rotational speed of the motor spindle or motor output shaft 704 to synchronize the rotational speed of the motor spindle or motor output shaft 704 relative to the gear assembly input shaft 712, it reduces the overall amount of NVH experience by the motor connect and disconnect assembly 702 as the sliding collar 736 is transitioned between the first and second positions 752 and 754. The amount of NVH experienced by the motor connect and disconnect assembly 702 may be due to a mashing or a misalignment of the plurality of gear assembly input stub shaft clutch teeth 734 of the gear assembly input shaft 712 and the plurality of sliding collar clutch teeth 746 of the sliding collar 736 during engagement or disengagement of the sliding collar 736 with the gear assembly input shaft 712. This aids in improving the overall life and durability of the motor connect and disconnect assembly 702 and the drive unit assembly 700 by allowing for a smooth transition of the sliding collar 736 between the first and second positions 752 and 754.

If, based on the rotational speed of the motor spindle or motor output shaft 704 and the first shaft 522 and/or the second shaft 568, the rotational speed of the gear assembly input shaft 712 is greater than the rotational speed of the gear assembly input shaft 712, then the control unit 608 will instruct the motor 302 to decrease the rotational speed of the motor spindle or motor output shaft 314. Once the rotational speed of the motor spindle or motor output shaft 704 is substantially equal to the rotational speed of the gear assembly input shaft 712, the control unit 608 will instruct the third actuation mechanism 748 to transition the sliding collar 736 of the motor connect and disconnect assembly 702 between the first engaged position 752 and the second disengaged position 754. By controlling the rotational speed of the motor spindle or motor output shaft 704 to synchronize the rotational speed of the motor spindle or motor output shaft 704 relative to the gear assembly input shaft 712, it reduces the overall amount of NVH experience by the motor connect and disconnect assembly 702 as the sliding collar 736 is transitioned between the first and second positions 752 and 754. The amount of NVH experienced by the motor connect and disconnect assembly 702 may be due to a mashing or a misalignment of the plurality of gear assembly input stub shaft clutch teeth 734 of the gear assembly input shaft 712 and the plurality of sliding collar clutch teeth 746 of the sliding collar 736 during engagement or disengagement of the sliding collar 736 with the gear assembly input shaft 712. This aids in improving the overall life and durability of the motor connect and disconnect assembly 702 and the drive unit assembly 700 by allowing for a smooth transition of the sliding collar 736 between the first and second positions 752 and 754.

According to an alternative embodiment of the disclosure and as a non-limiting example, the drive unit assembly 700 may further include the use of a fourth sensor 760 that is in communication with the control unit 608 of the drive unit assembly 700. As illustrated in FIGS. 9 and 10 of the disclosure and as a non-limiting example, the fourth sensor 760 is disposed radially outboard from at least a portion of the outer surface 718 of the gear assembly input shaft 712. The fourth sensor 760 is operably configured to sense the rotational speed of the gear assembly input shaft 712 of the drive unit assembly 700. It is within the scope of this disclosure and as a non-limiting example that the fourth sensor 760 of the drive unit assembly 700 may be an ABS sensor, a Hall effect sensor, a magnetic field sensor and/or any other sensor that is able to determine the rotational speed of a shaft.

The fourth sensor 760 of the drive unit assembly 700 is in communication with the control unit 608 of the drive unit assembly 700. According to the embodiment of the disclosure illustrated in FIGS. 9 and 10 and as a non-limiting example, the fourth sensor 760 may be in communication with the control unit 608 of the drive unit assembly 700 by using one or more fourth sensor data-links 762. The one or more fourth sensor data-links 762 allow for the communication of the rotational speed data collected by the fourth sensor 760 to the control unit 608 of the drive unit assembly 700. As a non-limiting example, the one or more fourth sensor data-links 762 may be one or more fiber optic cables and/or one or more electrical cables that put the fourth sensor 760 of the drive unit assembly 700 in electrical communication and/or optical communication with the control unit 608.

While the embodiment of the disclosure illustrated in FIGS. 9 and 10 illustrates the fourth sensor 760 of the drive unit assembly 700 being in electrical and/or optical communication with the control unit 608 via the one or more fourth sensor data-links 762, it is within the scope of this disclosure that the fourth sensor 760 may be in wireless communication with the control unit 608 of the drive unit assembly 700. In accordance with an embodiment of the disclosure and as a non-limiting example, the wireless communication between the control unit 608 and the fourth sensor 760 may be a Bluetooth connection, a Wi-fi connection, a cellular connection and/or a radio wave connection. As a result, it is within the scope of this disclosure that the fourth sensor 760 may be operably configured to transmit the rotational speed data collected wirelessly to the control unit 608 which in turn is operably configured to receive the wirelessly transmitted rotational data collected by the fourth sensor 760.

If the rotational speed of the gear assembly input shaft 712 is less than the rotational speed of the gear assembly input shaft 712, then the control unit 608 will instruct the motor 302 to increase the rotational speed of the motor spindle or motor output shaft 314. Once the rotational speed of the motor spindle or motor output shaft 704 is substantially equal to the rotational speed of the gear assembly input shaft 712, the control unit 608 will instruct the third actuation mechanism 748 to transition the sliding collar 736 of the motor connect and disconnect assembly 702 between the first engaged position 752 and the second disengaged position 754. As previously discussed, by controlling the rotational speed of the motor spindle or motor output shaft 704 to synchronize the rotational speed of the motor spindle or motor output shaft 704 relative to the gear assembly input shaft 712, it reduces the overall amount of NVH experience by the motor connect and disconnect assembly 702 as the sliding collar 736 is transitioned between the first and second positions 752 and 754. This aids in improving the overall life and durability of the motor connect and disconnect assembly 702 and the drive unit assembly 700 by allowing for a smooth transition of the sliding collar 736 between the first and second positions 752 and 754.

If the rotational speed of the gear assembly input shaft 712 is greater than the rotational speed of the gear assembly input shaft 712, then the control unit 608 will instruct the motor 302 to decrease the rotational speed of the motor spindle or motor output shaft 314. Once the rotational speed of the motor spindle or motor output shaft 704 is substantially equal to the rotational speed of the gear assembly input shaft 712, the control unit 608 will instruct the third actuation mechanism 748 to transition the sliding collar 736 of the motor connect and disconnect assembly 702 between the first engaged position 752 and the second disengaged position 754. As previously discussed, by controlling the rotational speed of the motor spindle or motor output shaft 704 to synchronize the rotational speed of the motor spindle or motor output shaft 704 relative to the gear assembly input shaft 712, it reduces the overall amount of NVH experience by the motor connect and disconnect assembly 702 as' the sliding collar 736 is transitioned between the first and second positions 752 and 754. This aids in improving the overall life and durability of the motor connect and disconnect assembly 702 and the drive unit assembly 700 by allowing for a smooth transition of the sliding collar 736 between the first and second positions 752 and 754.

According to an embodiment of the disclosure where the control unit 608 of the drive unit 700 is in communication with a vehicle bus 616 and as a non-limiting example, one or more data processors 628 of the vehicle bus 616 are operably configured to collect and analyze the rotational data collected from the first, second, third and/or fourth sensors 602, 604, 606 and/or 760. In accordance with this embodiment of the disclosure, the control unit 608 will not need the one or more control unit data processors 620 illustrated in FIGS. 9 and 10. When in operation, the one or more vehicle bus data processors 628 of the vehicle bus 616 will compare the rotational speed of the motor spindle or motor output shaft 704 to the rotational speed of the first shaft 522, the second shaft 568 and/or the gear assembly input shaft 712 of the drive unit assembly 700. Based on the rotational speed data analyzed, the vehicle bus 616 will instruct the control unit 608 to instruct the motor 302 to either increase or decrease the rotational speed of the motor spindle or motor output shaft 704.

If, based on the rotational speed of the motor spindle or motor output shaft 704, the first shaft 522, the second shaft 568 and/or the gear assembly input shaft 712, the rotational speed of the gear assembly input shaft 712 is less than the motor spindle or motor output shaft 704, then the vehicle bus 616 will instruct the control unit 608 to instruct the motor 302 to increase the rotational speed of the motor spindle or motor output shaft 704. Once the rotational speed of the motor spindle or motor output shaft 704 is substantially equal to the rotational speed of the gear assembly input shaft 712, the vehicle bus 616 will instruct the control unit 608 to instruct the third actuation mechanism 748 to transition the sliding collar 736 of the motor connect and disconnect assembly 702 between the first engaged position 752 and the second disengaged position 754. As previously discussed, by controlling the rotational speed of the motor spindle or motor output shaft 704 to synchronize the rotational speed of the motor spindle or motor output shaft 704 relative to the gear assembly input shaft 712, it reduces the overall amount of NVH experience by the motor connect and disconnect assembly 702 as the sliding collar 736 is transitioned between the first and second positions 752 and 754. This aids in improving the overall life and durability of the motor connect and disconnect assembly 702 and the drive unit assembly 700 by allowing for a smooth transition of the sliding collar 736 between the first and second positions 752 and 754.

If, based on the rotational speed of the motor spindle or motor output shaft 704, the first shaft 522, the second shaft 568 and/or the gear assembly input shaft 712, the rotational speed of the gear assembly input shaft 712 is greater than the motor spindle or motor output shaft 704, then the vehicle bus 616 will instruct the control unit 608 to instruct the motor 302 to decrease the rotational speed of the motor spindle or motor output shaft 704. Once the rotational speed of the motor spindle or motor output shaft 704 is substantially equal to the rotational speed of the gear assembly input shaft 712, the vehicle bus 616 will instruct the control unit 608 to instruct the third actuation mechanism 748 to transition the sliding collar 736 of the motor connect and disconnect assembly 702 between the first engaged position 752 and the second disengaged position 754. As previously discussed, by controlling the rotational speed of the motor spindle or motor output shaft 704 to synchronize the rotational speed of the motor spindle or motor output shaft 704 relative to the gear assembly input shaft 712, it reduces the overall amount of NVH experience by the motor connect and disconnect assembly 702 as the sliding collar 736 is transitioned between the first and second positions 752 and 754. This aids in improving the overall life and durability of the motor connect and disconnect assembly 702 and the drive unit assembly 700 by allowing for a smooth transition of the sliding collar 736 between the first and second positions 752 and 754.

It is within the scope of this disclosure and as a non-limiting example that the control unit 608 and/or the vehicle bus 616 may continuously monitor and analyze the rotational speed of the motor spindle or motor output shaft 704 and/or the gear assembly input shaft 712. Additionally, it is within the scope of this disclosure and as a non-limiting example that the control unit 608 and/or the vehicle bus 616 may monitor and analyze the rotational speed of the motor spindle or motor output shaft 704 and/or the gear assembly input shaft 712 at pre-determined intervals. As a non-limiting example, the pre-determined intervals may be upon receipt of an instruction to transition the sliding collar 736 between the first engaged positions 752 and the second disengaged positions 754. Furthermore, it is within the scope of this disclosure and as a non-limiting example that the control unit 608 of the drive unit assembly 700 may monitor and analyze the rotational speed of the motor spindle or motor output shaft 704 and/or the gear assembly input shaft 712 upon receiving an instruction from the vehicle bus 616 of the vehicle (not shown). As a non-limiting example, the instruction from the vehicle but 616 may be to begin monitoring and analyzing the rotational speed of the motor spindle or motor output shaft 704 and/or the gear assembly input shaft 712 and/or an instruction from the vehicle bus 616 to transition the sliding collar 736 between the first engaged position 752 and the second disengaged position 754.

Additionally, it is within the scope of this disclosure that the various embodiments of the disclosure described and illustrated herein may be combined with one another to make a drive unit assembly according to an embodiment of the disclosure.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A drive unit assembly, comprising:
a motor drivingly connected to a motor output shaft having a first end portion, a second end portion and an outer surface;
a gear assembly comprising a sun gear, one or more planetary gears, a gear assembly housing and a pinion gear;
   wherein said gear assembly housing has a first end portion, a second end portion, an inner surface and an outer surface defining a hollow portion therein, said second end portion of said gear assembly housing having a reduced diameter portion;
   wherein at least a portion of said sun gear and at least a portion of said one or more planetary gears are disposed within said hollow portion of said gear assembly housing;
   wherein at least a portion of said sun gear is drivingly connected to at least a portion of said second end portion of said motor output shaft;
   wherein said one or more planetary gears are drivingly and rotatively connected to at least a portion of said gear assembly housing;
   wherein at least a portion of said one or more planetary gears are drivingly connected to at least a portion of said sun gear and a plurality of gear teeth circumferentially extending from at least a portion of an inner surface of a drive unit housing;
   wherein said pinion gear has a first side, a second side, an inner surface and an outer surface defining a hollow portion therein; and
   wherein at least a portion of said first end portion of said gear assembly housing is integrally connected to at least a portion of said pinion gear;
a differential assembly comprising a differential case, a differential ring gear, a first side gear, a second side gear and one or more bevel gears;
   wherein at least a portion of said pinion gear is drivingly connected to at least a portion of said differential ring gear of said differential assembly; and
one or more sun gear bearings;
   wherein at least a portion of said one or more sun gear bearings is interposed between said sun gear of said gear assembly and an inner surface of a radially extending wall portion extending from said reduced diameter portion of said second end portion of said gear assembly housing.

2. The drive unit assembly of claim 1, wherein said motor is an electric motor.

3. The drive unit assembly of claim 1, wherein at least a portion of said motor and said motor output shaft extend transverse to said differential assembly.

4. The drive unit assembly of claim 1, wherein at least a portion of said pinion gear of said gear assembly is interposed between said sun gear and said motor of said drive unit assembly; and
   wherein at least a portion of said motor output shaft extends through said hollow portion of said pinion gear into said hollow portion of said gear assembly housing.

5. The drive unit assembly of claim 1, wherein said pinion gear of said gear assembly has a protruding portion extending axially outboard from at least a portion of said first side of said pinion gear; and
   wherein at least a portion of one or more pinion gear bearings are disposed radially outboard from and adjacent to at least a portion of said protruding portion of said first side of said pinion gear.

6. The drive unit assembly of claim 1, wherein at least a portion of one or more gear housing bearings are disposed radially outboard from and adjacent to at least a portion of said outer surface of said reduced diameter portion of said second end portion of said gear assembly housing.

7. The drive unit assembly of claim 1, wherein said differential case has a first end portion, a second end portion, an inner surface and an outer surface defining a hollow portion therein;
   wherein at least a portion of said second end portion of said differential case is integrally connected to at least a portion of said differential ring gear of said differential assembly;
   wherein at least a portion of said first end portion of said differential case has a reduced diameter portion; and
   wherein at least a portion of one or more differential case bearings are disposed radially outboard from and adjacent to at least a portion of said reduced diameter portion of said differential case.

8. The drive unit assembly of claim 1, wherein said differential ring gear has a protruding portion extending axially outboard from at least a portion of a second side of said differential ring gear; and
   wherein at least a portion of one or more differential ring gear bearings are disposed radially outboard from and adjacent to at least a portion of an outer surface of said protruding portion of said second side of said differential ring gear.

9. A drive unit assembly, comprising:
a motor drivingly connected to a motor output shaft having a first end portion, a second end portion and an outer surface;

a gear assembly comprising a sun gear, one or more planetary gears, a gear assembly housing and a pinion gear;
   wherein said gear assembly housing has a first end portion, a second end portion, an inner surface and an outer surface defining a hollow portion therein;
   wherein at least a portion of said sun gear and at least a portion of said one or more planetary gears are disposed within said hollow portion of said gear assembly housing;
   wherein at least a portion of said sun gear is drivingly connected to at least a portion of said second end portion of said motor output shaft;
   wherein said one or more planetary gears are drivingly and rotatively connected to at least a portion of said gear assembly housing;
   wherein at least a portion of said one or more planetary gears are drivingly connected to at least a portion of said sun gear and a plurality of gear teeth circumferentially extending from at least a portion of an inner surface of a drive unit housing;
   wherein said pinion gear has a first side, a second side, an inner surface and an outer surface defining a hollow portion therein; and
   wherein at least a portion of said first end portion of said gear assembly housing is integrally connected to at least a portion of said pinion gear;
a differential assembly comprising a differential case, a differential ring gear, a first side gear, a second side gear and one or more bevel gears;
   wherein at least a portion of said pinion gear is drivingly connected to at least a portion of said differential ring gear of said differential assembly;
a first stub shaft having a first end portion, a second end portion and an outer surface;
   wherein said first end portion of said first stub shaft has an increased diameter portion having a first end portion and a second end portion;
   wherein a plurality of first stub shaft clutch teeth extends outboard from at least a portion of said first end portion of said increased diameter portion of said first stub shaft; and
   wherein at least a portion of said second end portion of said first stub shaft is drivingly connected to at least a portion of said first side gear of said differential assembly;
a first axle half shaft having a first end portion, a second end portion and an outer surface, said first axle half shaft extending co-axially with said first stub shaft;
   wherein at least a portion of said second end portion of said first axle half shaft is rotatively connected to at least a portion of said first end portion of said first stub shaft; and
   wherein a plurality of axially extending first shaft splines circumferentially extends from at least a portion of said outer surface of said second end portion of said first axle half shaft; and
a first shaft connect and disconnect assembly, comprising:
   a first sliding collar having an inner surface and an outer surface, said first sliding collar extending co-axially with and being disposed radially outboard from at least a portion of said first axle half shaft;
      wherein a plurality of axially extending sliding collar splines circumferentially extends from at least a portion of said inner surface of said first sliding collar;
      wherein said plurality of axially extending sliding collar splines of said first sliding collar are complementary to and meshingly engaged with said plurality of axially extending first shaft splines of said first axle half shaft;
      wherein a plurality of sliding collar clutch teeth extends from at least a portion of said outer surface of said first sliding collar; and
      wherein said plurality of sliding collar clutch teeth of said first sliding collar are complementary to and selectively engageable with said plurality of first stub shaft clutch teeth of said first stub shaft; and
   a first actuation mechanism;
      wherein at least a portion of said first actuation mechanism is drivingly connected to at least a portion of said outer surface of said first sliding collar.

10. The drive unit assembly of claim 9, wherein said first shaft connect and disconnect assembly has a first position and a second position;
   wherein in said first position, said plurality of sliding collar clutch teeth of said first sliding collar of said first shaft connect and disconnect assembly are meshingly engaged with said plurality of first stub shaft clutch teeth of said increased diameter portion of said first stub shaft; and
   wherein in said second position, said plurality of sliding collar clutch teeth of said first sliding collar of said first shaft connect and disconnect assembly are not meshingly engaged with said plurality of first stub shaft clutch teeth of said increased diameter portion of said first stub shaft defining a gap therebetween.

11. The drive unit assembly of claim 9, further comprising a first sensor and a third sensor in communication with a control unit;
   wherein at least a portion of said first sensor is disposed radially outboard from at least a portion of said outer surface of said first axle half shaft and is operably configured to acquire data related to a rotational speed of said first axle half shaft;
   wherein said at least a portion of said third sensor is disposed radially outboard from at least a portion of said outer surface of said motor output shaft and is operably configured to acquire data related to a rotational speed of said motor output shaft;
   wherein said control unit is operably configured to receive said data relating to said rotational speed of said first axle half shaft from said first sensor and said data relating to said rotational speed of said motor output shaft from said third sensor;
   wherein said control unit comprises one or more data processors that are operably configured to monitor and analyze said data relating to said rotational speed of said motor output shaft and said rotational speed of said first axle half shaft; and
   wherein said control unit is operably configured to send a signal to said motor to increase or decrease said rotational speed of said motor output shaft until said rotational speed of said first axle half shaft is substantially equal to a rotational speed of said first stub shaft.

12. The drive unit assembly of claim 9, further comprising:
   a second stub shaft having a first end portion, a second end portion and an outer surface;

wherein at least a portion of said first end portion of said second stub shaft is drivingly connected to at least a portion of said second side gear of said differential assembly;

wherein said second end portion of said second stub shaft has an increased diameter portion having a first end portion and a second end portion; and wherein a plurality of second stub shaft clutch teeth extends outboard from at least a portion of said second end portion of said increased diameter portion of said second stub shaft;

a second axle half shaft having a first end portion, a second end portion and an outer surface, said second axle half shaft extending co-axially with said second stub shaft;

wherein at least a portion of said first end portion of said second axle half shaft is rotatively connected to at least a portion of said second end portion of said second stub shaft; and wherein a plurality of axially extending second shaft splines circumferentially extends from at least a portion of said outer surface of said first end portion of said second axle half shaft; and a second shaft connect and disconnect assembly, comprising:

a second sliding collar having an inner surface and an outer surface, said second sliding collar extending co-axially with and being disposed radially outboard from at least a portion of said second axle half shaft;

wherein a plurality of axially extending sliding collar splines circumferentially extends from at least a portion of said inner surface of said second sliding collar;

wherein said plurality of axially extending sliding collar splines of said second sliding collar are complementary to and meshingly engaged with said plurality of axially extending second shaft splines of said second axle half shaft;

wherein a plurality of sliding collar clutch teeth extends from at least a portion of said outer surface of said second sliding collar; and wherein said plurality of sliding collar clutch teeth of said second sliding collar are complementary to and selectively engageable with said plurality of second stub shaft clutch teeth of said second stub shaft; and a second actuation mechanism;

wherein at least a portion of said second actuation mechanism is drivingly connected to at least a portion of said outer surface of said second sliding collar.

13. The drive unit assembly of claim 12, wherein said second shaft connect and disconnect assembly has a first position and a second position;

wherein in said first position, said plurality of sliding collar clutch teeth of said second sliding collar of said second shaft connect and disconnect assembly are meshingly engaged with said plurality of second stub shaft clutch teeth of said increased diameter portion of said second stub shaft; and wherein in said second position, said plurality of sliding collar clutch teeth of said second sliding collar of said second shaft connect and disconnect assembly are not meshingly engaged with said plurality of second stub shaft clutch teeth of said increased diameter portion of said second stub shaft defining a gap therebetween.

14. The drive unit assembly of claim 12, further comprising a second sensor and a third sensor in communication with a control unit;

wherein at least a portion of said second sensor is disposed radially outboard from at least a portion of said outer surface of said second axle half shaft and is operably configured to acquire data related to a rotational speed of said second axle half shaft;

wherein said at least a portion of said third sensor is disposed radially outboard from at least a portion of said outer surface of said motor output shaft and is operably configured to acquire data related to a rotational speed of said motor output shaft;

wherein said control unit is operably configured to receive said data relating to said rotational speed of said second axle half shaft from said second sensor and said data relating to said rotational speed of said motor output shaft from said third sensor;

wherein said control unit comprises one or more data processors that are operably configured to monitor and analyze said data relating to said rotational speed of said motor output shaft and said rotational speed of said second axle half shaft; and wherein said control unit is operably configured to send a signal to said motor to increase or decrease said rotational speed of said motor output shaft until said rotational speed of said second axle half shaft is substantially equal to a rotational speed of said second stub shaft.

15. A drive unit assembly, comprising:

a motor drivingly connected to a motor output shaft;

a gear assembly comprising a sun gear, one or more planetary gears, a pinion gear, and a gear assembly housing, wherein the gear assembly housing comprises a first end portion, a second end portion, an inner surface, and an outer surface defining a hollow portion therein, the second end portion of the gear assembly housing having a reduced diameter portion, wherein at least a portion of the sun gear and at least a portion of the one or more planetary gears are disposed within the hollow portion of the gear assembly housing, wherein the sun gear is drivingly connected to the motor output shaft, wherein the one or more planetary gears are drivingly and rotatively connected to the gear assembly housing, wherein the one or more planetary gears are drivingly connected to the sun gear and a plurality of gear teeth circumferentially extending from an inner surface of a drive unit housing, and wherein at least a portion of the first end portion of the gear assembly housing is integrally connected to at least a portion of the pinion gear;

a differential assembly comprising a differential ring gear, wherein the pinion gear is drivingly connected to the differential ring gear of the differential assembly; and one or more sun gear bearings, wherein at least a portion of the one or more sun gear bearings is interposed between the sun gear of the gear assembly and an inner surface of a radially extending wall portion extending from the reduced diameter portion of the second end portion of the gear assembly housing.

16. The drive unit assembly of claim 15, wherein the differential assembly further comprises a side gear, and wherein the drive unit assembly further comprises:
a first stub shaft having a first end portion and a second end portion,
wherein the first end portion of the first stub shaft has an increased diameter portion,
wherein a plurality of first stub shaft clutch teeth extends outboard from the increased diameter portion of the first stub shaft, and
wherein the second end portion of the first stub shaft is drivingly connected to the side gear of the differential assembly;
a first axle half shaft having an end portion,
wherein the first axle half shaft extends co-axially with the first stub shaft,
wherein an end portion of the first axle half shaft is rotatively connected to the first end portion of the first stub shaft, and
wherein a plurality of axially extending first shaft splines circumferentially extends from the end portion of the first axle half shaft; and
a first shaft connect and disconnect assembly, comprising:
a sliding collar having an inner surface and an outer surface,
wherein the sliding collar extends co-axially with and is disposed radially outboard from the first axle half shaft,
wherein a plurality of axially extending sliding collar splines circumferentially extends from the inner surface of the sliding collar,
wherein the plurality of axially extending sliding collar splines of the sliding collar is complementary to and meshingly engaged with the plurality of axially extending first shaft splines of the first axle half shaft,
wherein a plurality of sliding collar clutch teeth extends from the outer surface of the sliding collar, and
wherein the plurality of sliding collar clutch teeth of the sliding collar is complementary to and selectively engageable with the plurality of first stub shaft clutch teeth of the first stub shaft; and
a first actuation mechanism,
wherein the first actuation mechanism is drivingly connected to the outer surface of the sliding collar.

17. The drive unit assembly of claim 16, wherein the first shaft connect and disconnect assembly has a first position and a second position,
wherein in the first position, the plurality of sliding collar clutch teeth of the sliding collar is meshingly engaged with the plurality of first stub shaft clutch teeth of the first stub shaft, and
wherein in the second position, the plurality of sliding collar clutch teeth of the sliding collar is not meshingly engaged with the plurality of first stub shaft clutch teeth of the first stub shaft defining a gap therebetween.

18. The drive unit assembly of claim 16, further comprising a first sensor and a second sensor in communication with a control unit,
wherein the first sensor is disposed radially outboard from the first axle half shaft and is operably configured to acquire data related to a rotational speed of the first axle half shaft,
wherein the second sensor is disposed radially outboard from the motor output shaft and is operably configured to acquire data related to a rotational speed of the motor output shaft,
wherein the control unit is operably configured to receive the data relating to the rotational speed of the first axle half shaft from the first sensor and the data relating to the rotational speed of the motor output shaft from the second sensor,
wherein the control unit comprises one or more data processors that are operably configured to monitor and analyze the data relating to the rotational speed of the first axle half shaft and the rotational speed of the first axle half shaft, and
wherein the control unit is operably configured to send a signal to the motor to increase or decrease the rotational speed of the motor output shaft until the rotational speed of the first axle half shaft is substantially equal to a rotational speed of the first stub shaft.

* * * * *